(12) United States Patent
Umeno et al.

(10) Patent No.: US 8,924,324 B2
(45) Date of Patent: Dec. 30, 2014

(54) BEHAVIOR ESTIMATION APPARATUS, THRESHOLD CALCULATION APPARATUS, BEHAVIOR ESTIMATION METHOD AND NON-TRANSITORY COMPUTER READABLE MEDIUM THEREOF

(71) Applicant: Kabushiki Kaisha Toshiba, Minato-ku (JP)

(72) Inventors: Shinya Umeno, Kanagawa-ken (JP); Yoshiyuki Sakamoto, Saitama-ken (JP); Hideo Sakamoto, Kanagawa-ken (JP); Takashi Koiso, Kanagawa-ken (JP); Shuuichiro Imahara, Kanagawa-ken (JP); Ryusei Shingaki, Tokyo (JP); Toru Yano, Tokyo (JP); Ryosuke Takeuchi, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/015,547

(22) Filed: Aug. 30, 2013

(65) Prior Publication Data

US 2014/0142862 A1    May 22, 2014

(30) Foreign Application Priority Data

Nov. 20, 2012    (JP) ................................. 2012-254748

(51) Int. Cl.

| | | |
|---|---|---|
| *G06Q 10/04* | (2012.01) | |
| *H04B 17/00* | (2006.01) | |
| *G06Q 50/06* | (2012.01) | |
| *G06N 5/04* | (2006.01) | |
| *H02J 4/00* | (2006.01) | |
| *H02J 3/00* | (2006.01) | |

(52) U.S. Cl.
CPC ................ *G06Q 10/04* (2013.01); *G06N 5/046* (2013.01); *H02J 4/00* (2013.01); *H04B 17/007* (2013.01); *G06Q 50/06* (2013.01); *H02J 3/00* (2013.01); *H02J 2003/003* (2013.01)
USPC .............................................. 706/42; 706/45

(58) Field of Classification Search
None
See application file for complete search history.

(56) References Cited

U.S. PATENT DOCUMENTS

| | | |
|---|---|---|
| 2010/0161502 A1 | 6/2010 | Kumazawa et al. |
| 2010/0222935 A1 | 9/2010 | Forbes, Jr. et al. |
| 2013/0184888 A1 | 7/2013 | Forbes, Jr. et al. |

FOREIGN PATENT DOCUMENTS

| | | |
|---|---|---|
| JP | 2001-54176 A | 2/2001 |
| JP | 2005-65099 | 3/2005 |

(Continued)

OTHER PUBLICATIONS

Chen, Ming, "Adaptive Performance and Power Management in Distributed Computing Systems." PhD diss., University of Tennessee, 2010, pp. 1-176.*

(Continued)

*Primary Examiner* — Wilbert L Starks
(74) *Attorney, Agent, or Firm* — Oblon, Spivak, McClelland, Maier & Neustadt, L.L.P.

(57) ABSTRACT

According to one embodiment, a behavior estimation apparatus includes a storage unit, a first calculation unit, a second calculation unit, and an estimation unit. The storage unit stores first data collecting power values consumed by a consumer in a period. The first calculation unit calculates second data representing a frequency of each power value by using the first data. The second calculation unit calculates a first threshold to divide a first power value from a second power value which is larger than and next to the first power value, among power values corresponding to maximal values of frequencies included in the second data. The estimation unit obtains a power value consumed by the consumer in an estimating period, and estimates the consumer's behavior status in the estimating period by using the power value and the first threshold.

18 Claims, 25 Drawing Sheets

(56) References Cited

FOREIGN PATENT DOCUMENTS

| | | |
|---|---|---|
| JP | 2008-310729 A | 12/2008 |
| JP | 2011-39886 | 2/2011 |
| JP | 2011-43984 | 3/2011 |
| JP | 2011-53951 | 3/2011 |
| JP | 2012-208613 A | 10/2012 |
| JP | 5191412 | 2/2013 |
| KR | 10-2011-0034169 A | 4/2011 |
| WO | WO 2010-143588 A1 | 12/2010 |

OTHER PUBLICATIONS

Office Action mailed Feb. 1, 2013, in Japanese Patent Application No. 2012-254748 (with English-language translation).

Extended European Search Report issued May 14, 2014 in Patent Application No. 13182536.6.

B.G.C.C. Tuip BSc., et al., "Occupancy based fault detection on building level—a feasibility study", Proceedings of $10^{th}$ International Conference for Enhanced Building Operations, Kuwait: ICEBO, XP055116357, 2010, 6 Pages.

* cited by examiner

| SERIAL NUMBER | MEASUREMENT TIME | MEASUREMENT VALUE (W) |
| --- | --- | --- |
| 1 | 2012/2/23 00:00 | 115 |
| 2 | 2012/2/23 00:01 | 210 |
| 3 | 2012/2/23 00:02 | 113 |
| 4 | 2012/2/23 00:03 | 1235 |
| 5 | 2012/2/23 00:04 | X |
| 6 | 2012/2/23 00:05 | 132 |
| ⋮ | ⋮ | ⋮ |
| 121 | 2012/2/23 02:00 | 120 |
| 122 | 2012/2/23 02:01 | 123 |
| ⋮ | ⋮ | ⋮ |
| 1440 | 2012/2/23 23:59 | X |
| 1441 | 2012/2/24 00:00 | 162 |
| 1442 | 2012/2/24 00:01 | 320 |
| ⋮ | ⋮ | ⋮ |

FIG. 4

| SERIAL NUMBER | MINIMUM | MAXIMUM |
|---|---|---|
| 1 | 0 | E1 |
| 2 | E1 | E2 |
| 3 | E2 | E3 |
| 4 | E3 | ∞ |

FIG. 9

| SERIAL NUMBER | KIND | MINIMUM | MAXIMUM |
|---|---|---|---|
| 1 | BASE POWER | 0 | E1 |
| 2 | BEHAVIOR POWER | E1 | ∞ |
| 3 | LONG TERM BEHAVIOR POWER | E1 | E2 |
| 4 | SHORT TERM BEHAVIOR POWER | E2 | ∞ |
| 5 | SHORT TERM BEHAVIOR POWER SUB 1 | E2 | E3 |
| 6 | SHORT TERM BEHAVIOR POWER SUB 2 | E3 | E4 |
| 7 | SHORT TERM BEHAVIOR POWER SUB 3 | E4 | ∞ |

FIG. 24

BEHAVIOR ESTIMATION APPARATUS, THRESHOLD CALCULATION APPARATUS, BEHAVIOR ESTIMATION METHOD AND NON-TRANSITORY COMPUTER READABLE MEDIUM THEREOF

CROSS-REFERENCE TO RELATED APPLICATION

This application is based upon and claims the benefit of priority from Japanese Patent Application No. 2012-254748, filed on Nov. 20, 2012; the entire contents of which are incorporated herein by reference.

FIELD

Embodiments described herein relate generally to a behavior estimation apparatus, a threshold calculation apparatus, a behavior estimation method and a non-transitory computer readable medium thereof.

BACKGROUND

In order to suitably manage power consumption of a consumer such as an ordinary household, or in order to supply various services based on information of power consumption, a person's behavior status in the consumer needs to be easily estimated. Briefly, it is desired to obtain an accurate estimation of the consumer's behavior without a human sensor or information set by the consumer itself (such as "present at home").

BRIEF DESCRIPTION OF THE DRAWINGS

FIG. 4 is one example of power value data according to the first embodiment.

FIG. 9 is one example of threshold set data according to the first embodiment.

FIG. 24 is one example of power value range set data according to the second embodiment.

DETAILED DESCRIPTION

According to one embodiment, a behavior estimation apparatus includes a storage unit, a first calculation unit, a second calculation unit, and an estimation unit. The storage unit stores first data collecting power values consumed by a consumer in a period. The first calculation unit is configured to calculate second data representing a frequency of each power value by using the first data. The second calculation unit is configured to calculate a first threshold to divide a first power value from a second power value which is larger than and next to the first power value, among power values corresponding to maximal values of frequencies included in the second data. The estimation unit is configured to obtain a power value consumed by the consumer in an estimating period, and to estimate the consumer's behavior status in the estimating period by using the power value and the first threshold.

Various embodiments will be described hereinafter with reference to the accompanying drawings.

The First Embodiment

Figure 1:
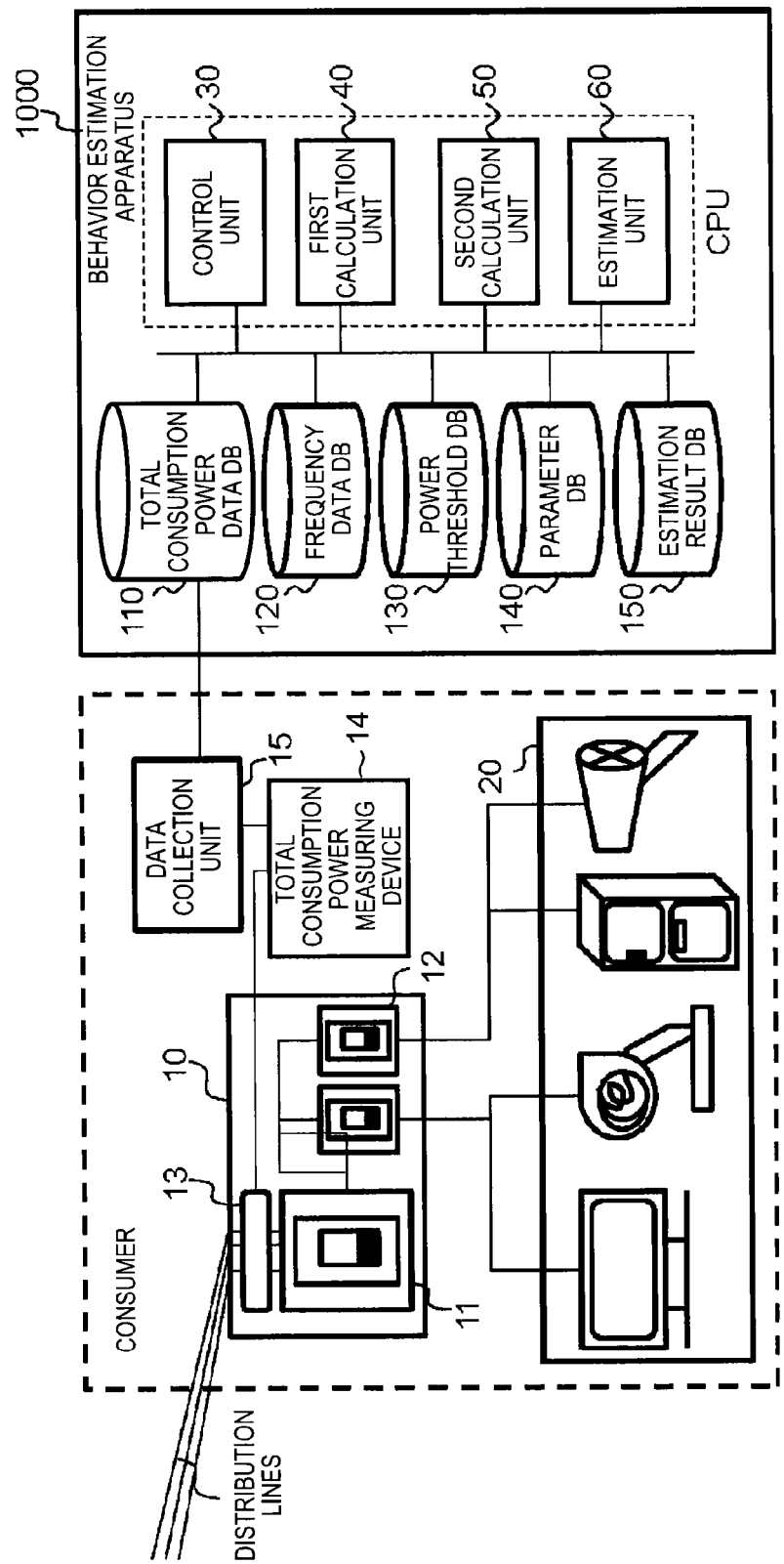
FIG. 1 is a block diagram of a system including an estimation apparatus according to a first embodiment.

FIG. 1 is a block diagram of a system including a behavior estimation apparatus 1 according to the first embodiment. In this example, the behavior estimation apparatus 100 is located in a consumer's external server. Briefly, the consumer and the behavior estimation apparatus 1000 are connected via, for example, a network. Here, the consumer is, for example, a house, an apartment room, a store such as a super market, an office building, or a factory. Furthermore, the customer may be any group of rooms/buildings that are equipped with a plurality of electric devices consuming (using) a power, that are expected to have power consumption related to person's behavior, and whose total consumption power data can be controlled as one total consumption power.

Distribution lines outside the consumer are led into a panel board 10 in the consumer, and connected to a total consumption power breaker 11 as a generalized breaker in the consumer. The total consumption power breaker 11 is supplied with a power from this distribution line. Under the total consumption power breaker 11, the distribution lines are branched to sub breakers 12, and finally connected to a plurality of electric devices (home appliances) 20. In FIG. 1, a television, an illumination, a refrigerator and a dryer, are connected to the sub breaker 12. Moreover, the sub breaker 12 and the electric device 20 are normally connected via consent (not shown in FIG. 1). Furthermore, as the electric device 20, a home appliance which consumes power by operation thereof may be used. For example, an air conditioner, a washing basket machine, a cleaner, an iron, an instant water heater, and an IH cooker, may be connected to the sub breaker 12.

At the distribution lines connected to the total consumption power 11, an electric current meter 13 is located. By using a measured value obtained from the electric current sensor 12, a total consumption power measuring device 14 periodically measures an instantaneous value (instantaneous power) of used power in the consumer. For example, this measurement is performed at one minute interval, however, may be shorter or longer than this interval. The total consumption power measuring device 14 sends a measurement value of this instantaneous power as measurement value data to a data collection unit 15 wirelessly or wiredly. The data collection unit 15 temporarily stores the power value data, and sends the power value data to the behavior estimation apparatus 1000 wirelessly or wiredly.

In the behavior estimation apparatus 1000 of FIG. 1, by using power value data of one day or a plurality of days, a power threshold is calculated in order to estimate whether a person (such as a resident) is present in the consumer (for example, a house) or is absent from the consumer, whether the power is intentionally consumed, and the person's behavior (behavior status) related to the power consumption. For example, by comparing this power threshold with the latest used power, the behavior status is estimated.

Figure 2:
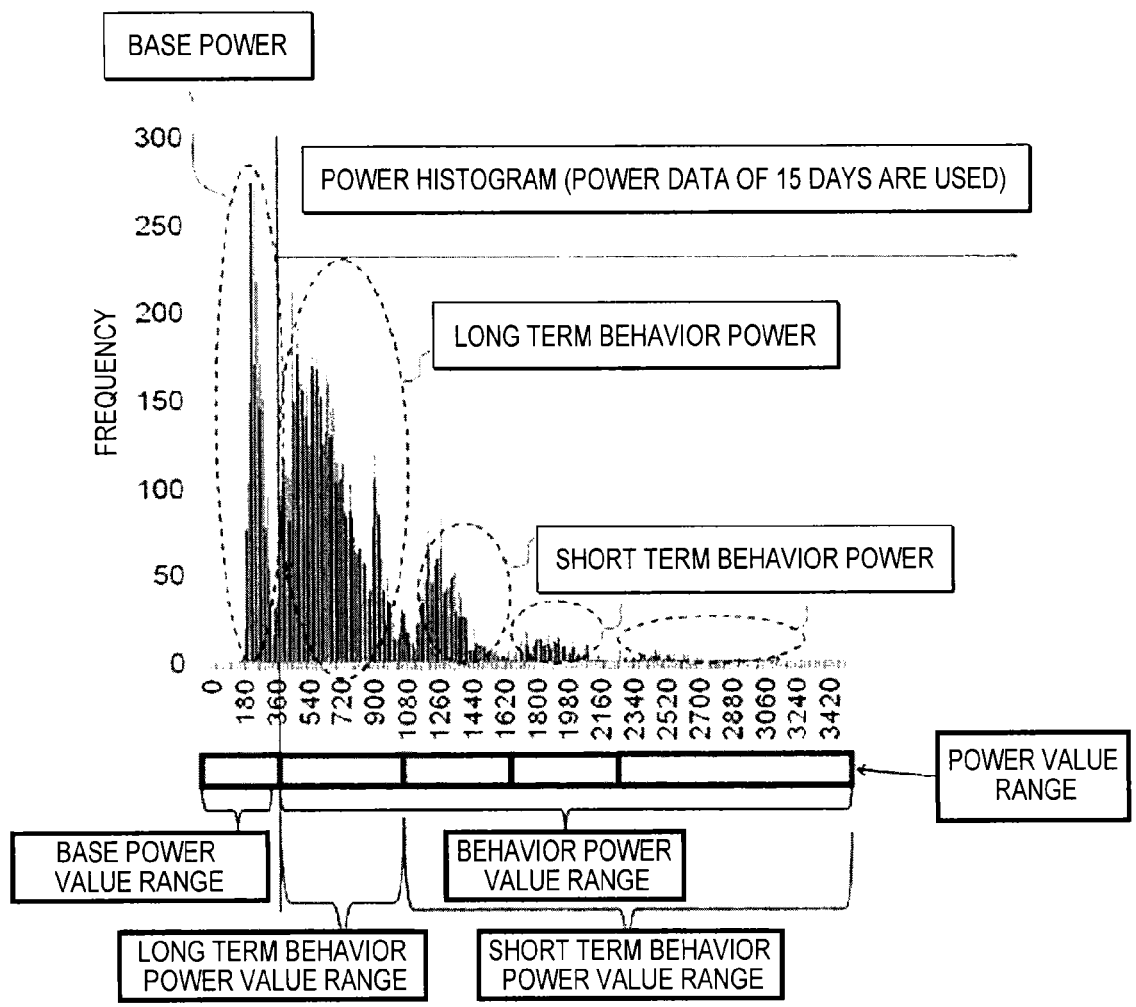
FIG. 2 is one schematic diagram to explain behavior status according to the first embodiment.
Figure 3:
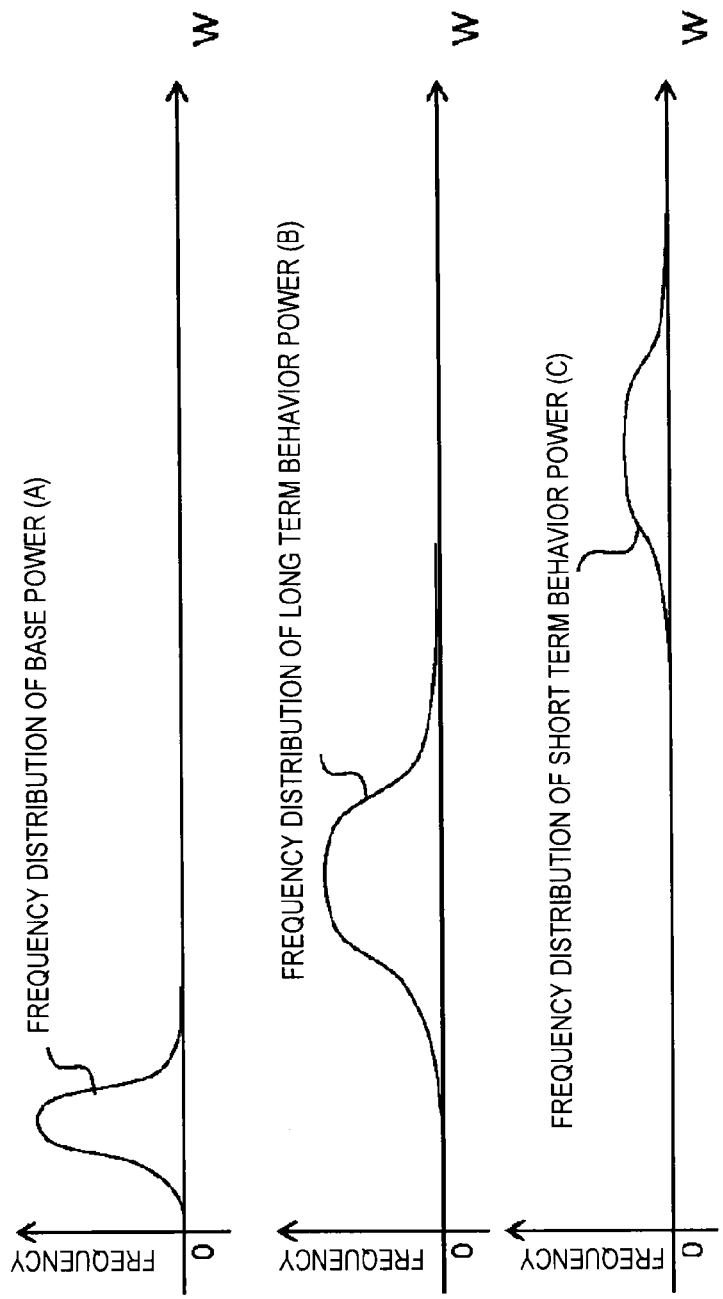
FIGS. 3A, 3B and 3C are other schematic diagrams to explain behavior status according to the first embodiment.

FIGS. 2 and 3 are schematic diagrams to explain the behavior status according to the first embodiment.

Due to a person's (For example, a resident) behavior status in the consumer (For example, a house), a frequency distribution (probability distribution) of power consumption is statistically different. This is because, due to the behavior status, the electric device to be used in the consumer is different. In the first embodiment, this feature is focused on. For example, when the resident is under behavior status such as "absent from home (go out)", a power mainly used in the home is the power consumed by a device always operated independently from the resident's behavior, such as waiting power of each electric device or refrigerator. This power is called the "base power". Furthermore, when the resident is under a normal behavior status such as "family chattering" or "relaxing at home" in the consumer, in addition to the "base power", a power consumed by an illumination, an air conditioner to adjust an indoor living environment, and a power by a television or a game machine are added to the total consumption power. This power that is stably used in a behavior extended for a long time (long term behavior) is called the "long term behavior power". Furthermore, in contrast to "family chattering" or "relaxing at home", some electric devices are used with high power consumption by a behavior having clear purpose, for example, an instant water heater while "making coffee", a microwave oven or a rice cooker while "cooking", or a dryer while "drying hair". This additional power used by the above devices is added to the "long term behavior power", and creates the "short term behavior power".

As to "base power (A)", "long term behavior power (B)" and "short term behavior power (C)", as mentioned-above, B is equal to A plus a power such as an illumination, and C is equal to B plus a power such as a microwave oven. Therefore, averages of frequency distribution of respective powers have a relationship "A<B<C". Due to the number of electric devices to be used (For example, the number of illuminations used at the same time), respective powers A, B and C have variance. For example, the frequency distribution of A has a chevron shape with an average of A as a center value of occurrences that has a maximal frequency. As to B and C, occurrence frequency thereof shapes similar frequency distribution (FIGS. 3B and 3C). In general, the width of this distribution (variance) is comparatively smaller than a difference between respective averages of A and B, and a difference between respective averages of B and C.

In the behavior estimation apparatus 1000 to be explained hereinafter, based on above-mentioned knowledge, by focusing on that the measured electric power value (power value) is originated in which of "base power (A)", "long term behavior power (B)" and "short term behavior power (C)", the consumer's behavior status, i.e., whether a person is present at home or is absent from home in the consumer, is estimated.

The behavior estimation apparatus 1000 includes a control unit 30, a first calculation unit 40, a second calculation unit 50, an estimation unit 60, a total consumption power data DB 110, a frequency data DB 120, a power threshold DB 130, a parameter DB 140, and an estimation result DB 150. The control unit 30 controls the behavior estimation apparatus 1000. By using power value data (first data) in a period (for example, predetermined period), the first calculation unit 40 calculates frequency data (second data) representing a frequency (occurrence frequency or probability density) of a measurement value based on each power value. Among power values corresponding to maximal values of frequency, the second calculation unit 50 calculates one or a plurality of power thresholds to divide one power value (first power value) from a power value (second power value) which is larger than and next to the first power value. The estimation unit 60 estimates a consumer's behavior status by using the power threshold. Moreover, for example, processing of the control unit 30, the first calculation unit 40, the second calculation unit 50 and the estimation unit 60, is executed by using an operation processing device such as a CPU.

The total consumption power data DB 110 stores power value data received from the data collection unit 15 of the consumer. FIG. 4 is one example of the power value data. In this example, power value data of one household stored into the total consumption power data DB are shown. In FIG. 4, the power value data include a serial number, a data measurement time (time stamp), and a measurement value (For example, unit is watt (w)), at each entry. If the total consumption power measuring device 14 fails in measuring an instantaneous power, by setting a measurement value of power value data at this time to "X", this power value data is regarded as a loss.

The control unit 30 controls start, execution, and completion of each processing operation of all or any of the first calculation unit 40, the second calculation unit 50, and the estimation unit 60. Furthermore, the control unit 30 may not directly control the first calculation unit 40, the second calculation unit 50 and the estimation unit 60, but simply give a trigger to start, execute and complete each processing operation. Moreover, as an external instruction, for example, a consumer or a manager can give to the behavior estimation apparatus 1000 by inputting a signal via an input terminal (not shown in FIG. 1).

Figure 5:
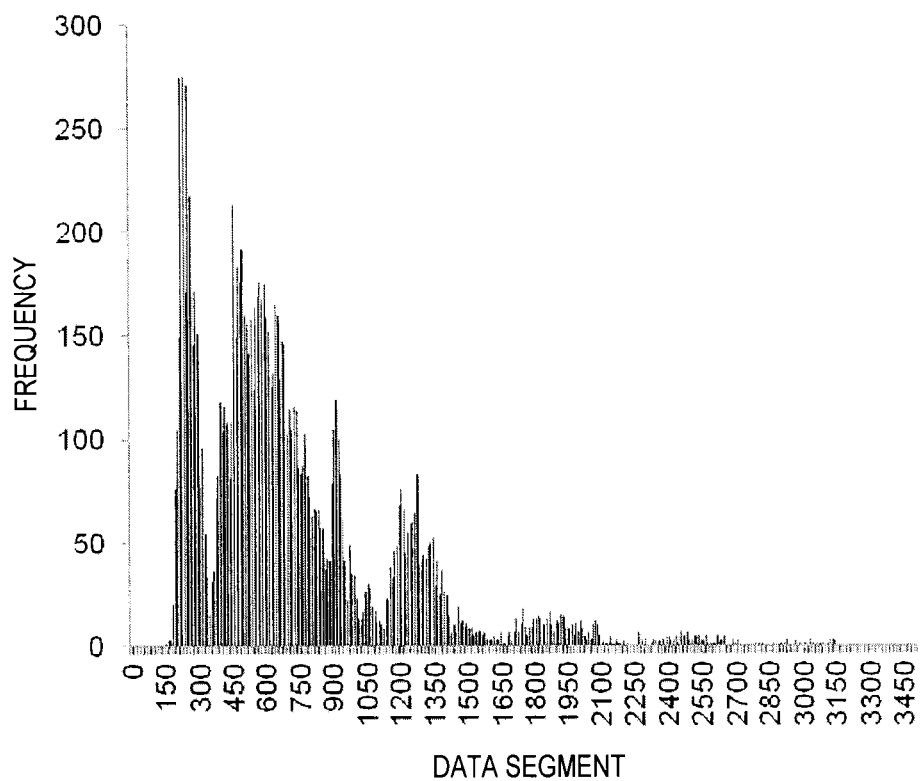
FIG. 5 is one example of frequency data according to one example.

The first calculation unit 40 calculates frequency data including each power value corresponding to a frequency of the measurement value, by referring to power value data of a predetermined period (N days) stored in the total consumption power data DB 110. FIG. 5 is one example of the frequency data. In FIG. 5, numerical data showing the frequency of the measurement value for the power value is represented as a histogram. For example, the first calculation unit 40 stores the frequency data as a format of the numerical data into the frequency data DB 120.

The second calculation unit 50 calculates a plurality of thresholds (threshold set) to divide a value range of a power value space into a plurality (M units) of value ranges, by referring to the frequency data stored in the frequency data DB 120. The threshold set calculated by the second calculation unit 50 divides the value ranges into a plurality of value ranges so that each value range includes a power value corresponding to different maximal value of the frequency of the measurement values. Namely, each of the plurality of value ranges is calculated by focusing on sparseness and denseness of distribution of the measurement values. Each of the plurality of value ranges includes a chevron distribution in which a dense part that have a higher frequency compared to its neighbor is positioned at a center, and a sparse part that have a less frequency compared to the center is positioned at the edges. The second calculation unit 50 stores the threshold set data into the power threshold DB 130.

Figure 6:
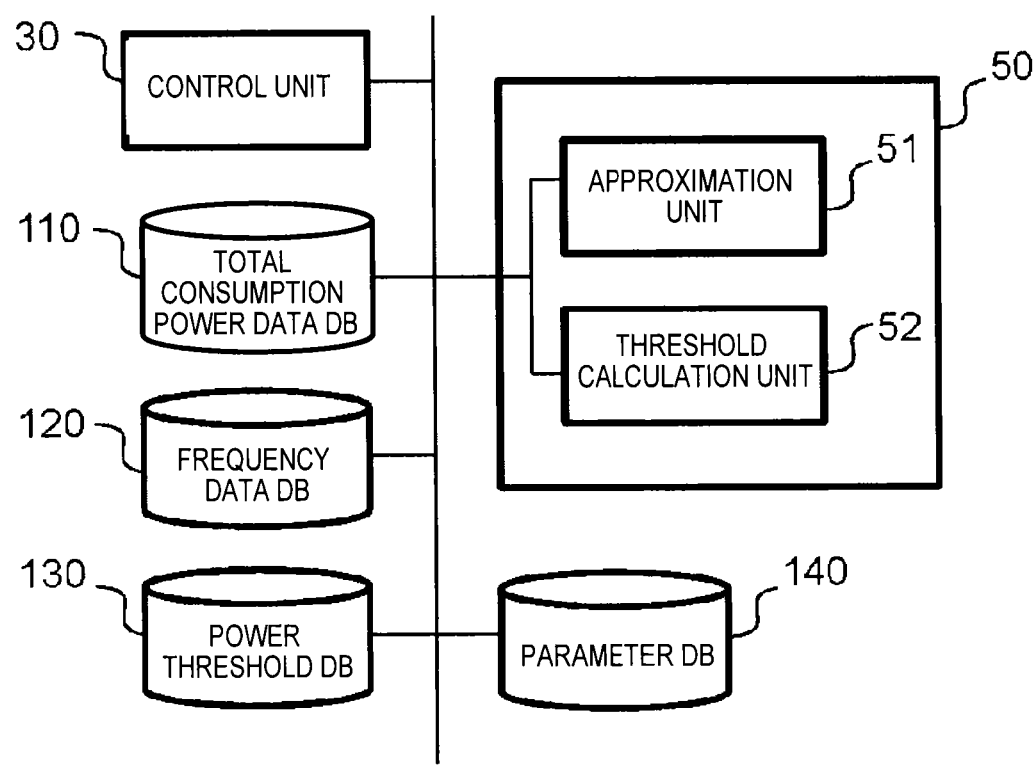
FIG. 6 is a block diagram of a second calculation unit in FIG. 1.

FIG. 6 is a block diagram of the second calculation unit 50. The second calculation unit 50 includes an approximation unit (a third calculation unit) 51 and a threshold calculation unit (a fourth calculation unit) 52.

Figure 7:
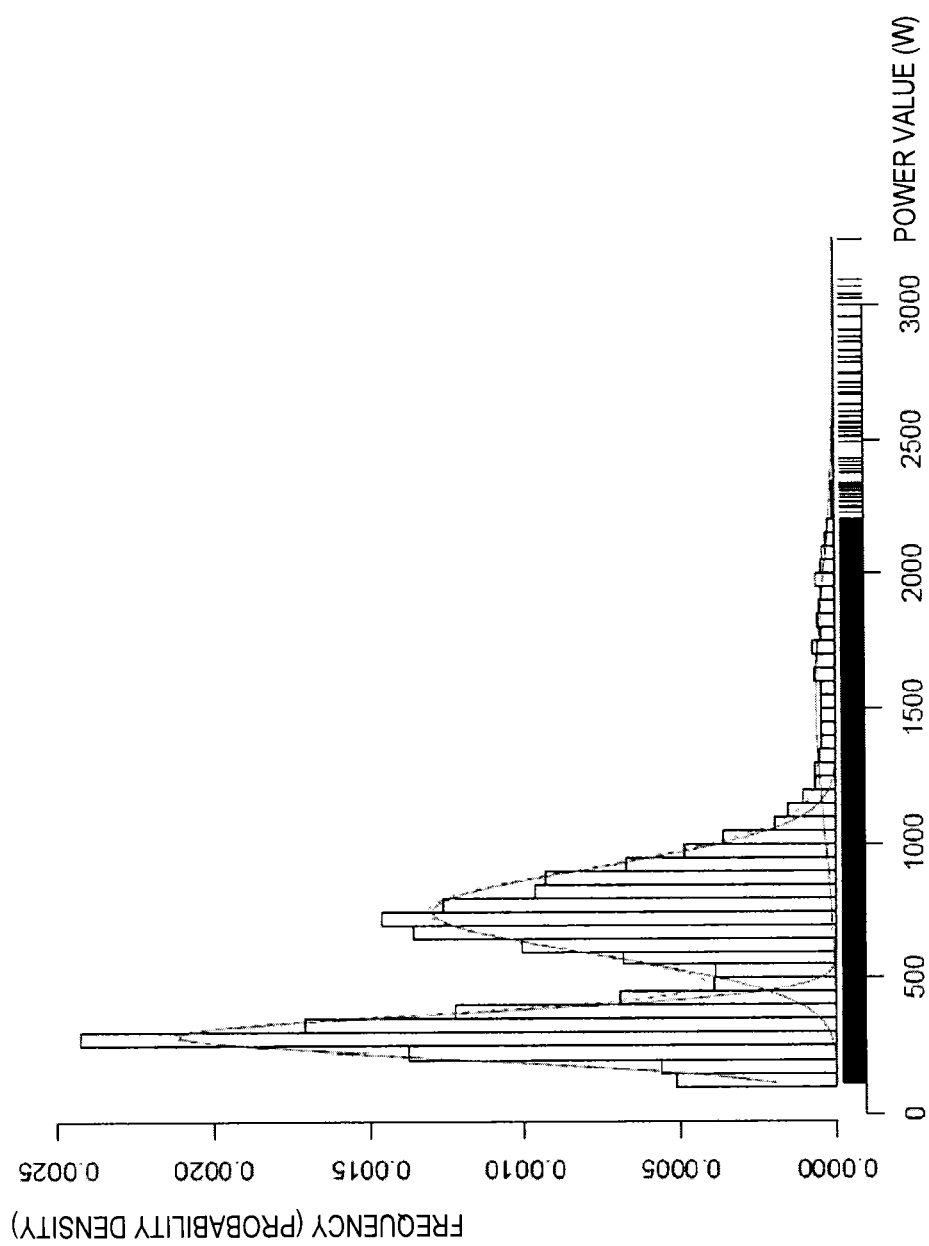
FIG. 7 is one example of approximated frequency distribution of measurement value according to the first embodiment.

The approximation unit 51 applies a probability model to the frequency distribution of the measurement value included in frequency data. Here, for example, by referring to the number (M) of divided value ranges previously stored in the parameter DB 140, the probability model is fitted. As a result, the frequency distribution is approximated to a probability distribution of M units each including a maximal value. In this case, for example, by using EM (Expectation-Maximization) algorithm of Gaussian mixture model as one of probability model, parameters of probability distribution of M units are calculated. FIG. 7 is an approximation example of the frequency distribution of the measurement value in case of "M=3". The approximation unit 51 stores the parameters (such as average, distribution) of the probability distribution of M units (frequency distribution is approximated) into the parameter DB 140.

Figure 8:
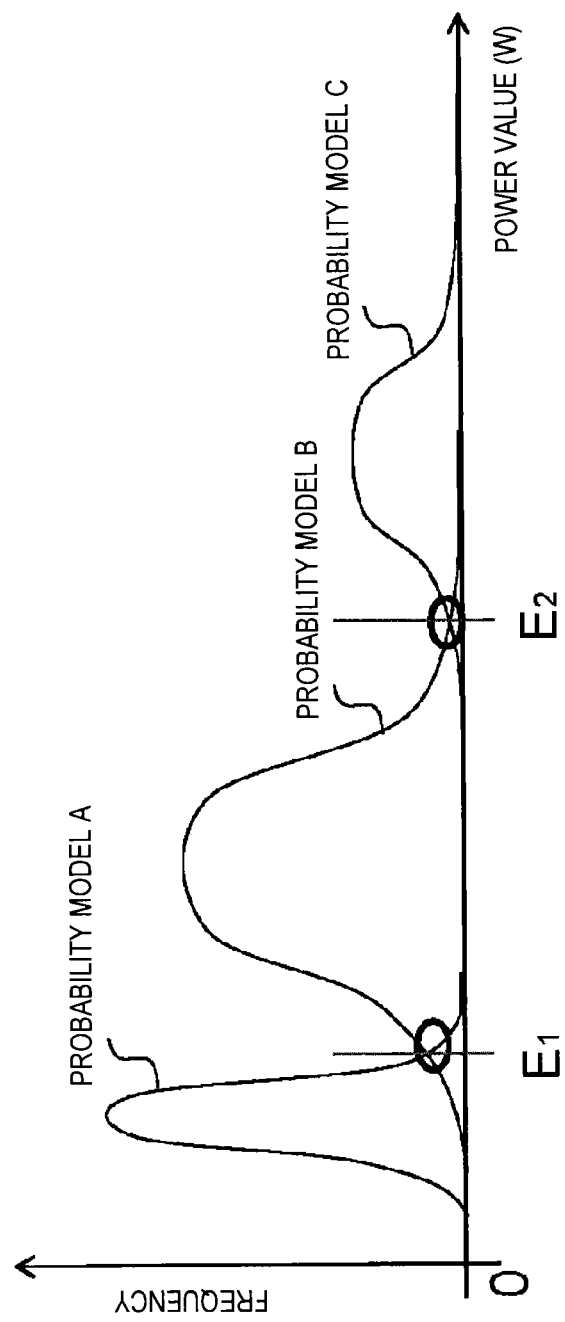
FIG. 8 is one example of thresholds according to the first embodiment.

The threshold calculation unit 52 calculates power thresholds of (M−1) units to divide into value ranges of M units each including a power value corresponding to different maximal value of the probability distribution. The threshold calculation unit 52 stores threshold set data into the power threshold DB 130. FIG. 8 is one example of thresholds in case of "M=3". In this example, the threshold calculation unit 52 calculates a power value corresponding to an intersection point of probability model (obtained by applying to frequency distribution of measurement value by the approximation unit 51) as a threshold. Namely, an intersection point between probability models A and B is calculated as a threshold (E1), and an intersection point between probability models B and C is calculated as a threshold (E2). FIG. 9 is one example of threshold set data. As shown in FIG. 9, each entry includes a serial number of a value range, a threshold representing a minimum of the value range, and a threshold representing a maximum of the value range.

By referring to threshold set data stored in the power threshold DB 130, the estimation unit 60 compares the measurement value with each threshold using time series data of the measurement value of instantaneous power in an arbitrary period to be estimated (estimating period), and estimates a behavior status. Moreover, as the time series data of the measurement value, past time series data obtained from the total consumption power data DB 110 may be used, or measurement values measured by the total consumption power measuring device 14 in real time may be used. Furthermore, for example, the estimating period can be previously set based on an external instruction from a manager of the consumer or a manager of the behavior estimation apparatus 1000.

Figure 10:
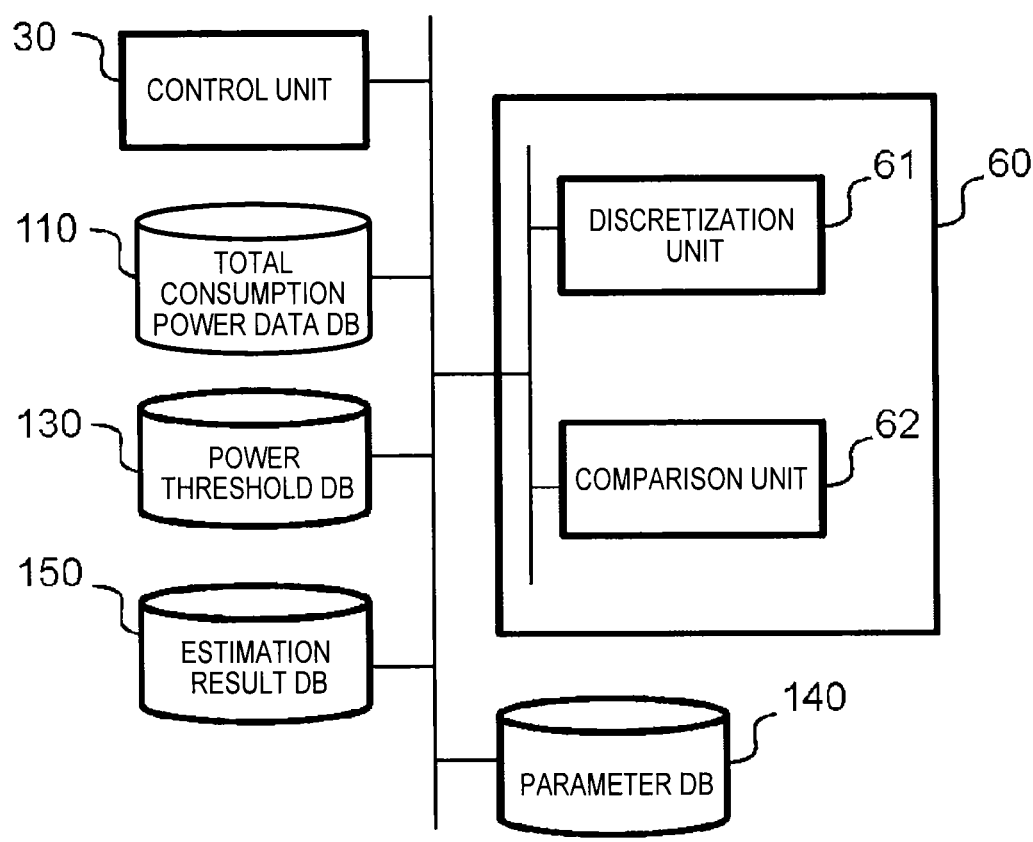
FIG. 10 is a block diagram of an estimation unit in FIG. 1.

FIG. 10 is a block diagram of the estimation unit 60. The estimation unit 60 includes a discretization unit 61 and a comparison unit 62.

Figure 11A:
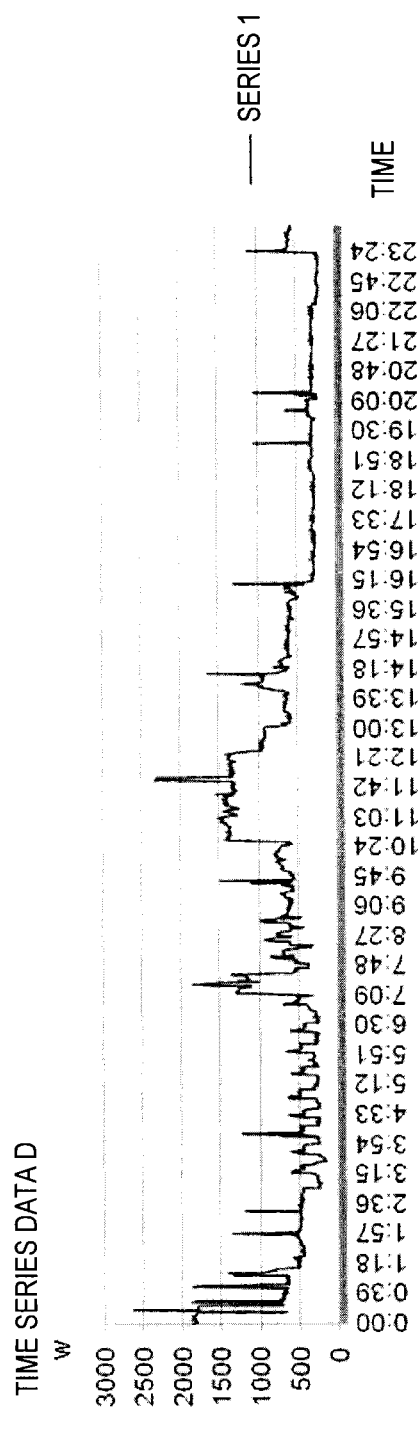
FIGS. 11A and 11B are time series data D' discretized according to the first embodiment.
Figure 11B:
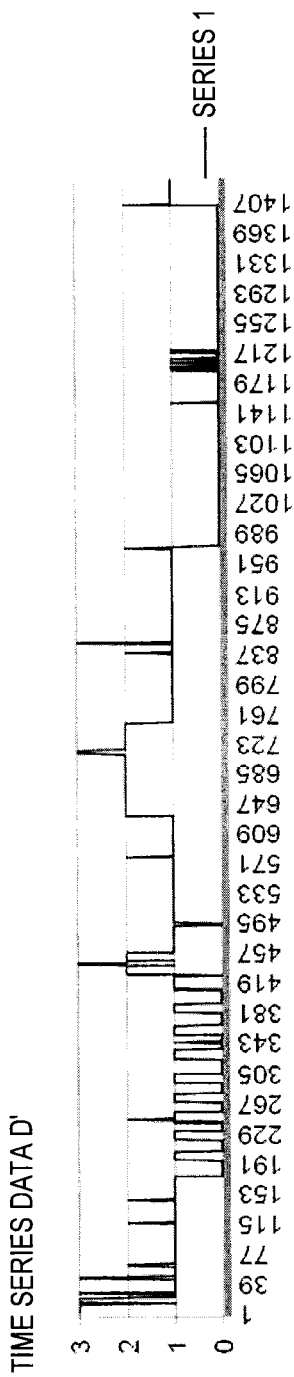

The discretization unit 61 discretizes time series data D of measurement values by (M−1) steps (0~(M−2)), and calculates discretized time series data D'. This time series data D' is temporarily stored into the parameter DB 140. FIG. 11 is one example of the time series data D and the time series data D' discretized.

By referring to the time series data D', the comparison unit 62 compares discretized measurement values with integral numbers (equivalent to thresholds) from 0 (equivalent to a threshold E1) to (M−2), and estimates a behavior status at a predetermined time slot. For example, if a discretized measurement value is 0, the comparison unit 62 estimates that "base power" appeared, and estimates that a person is absent from home or there is no intentional usage of power in the consumer. Furthermore, if the discretized measurement value is larger than or equal to 1, the comparison unit 62 estimates that "behavior power" appeared, and estimates that a person is present at home or there is intentional usage of power in the consumer. This estimation result is stored into the estimation result DB 150.

Figure 12:
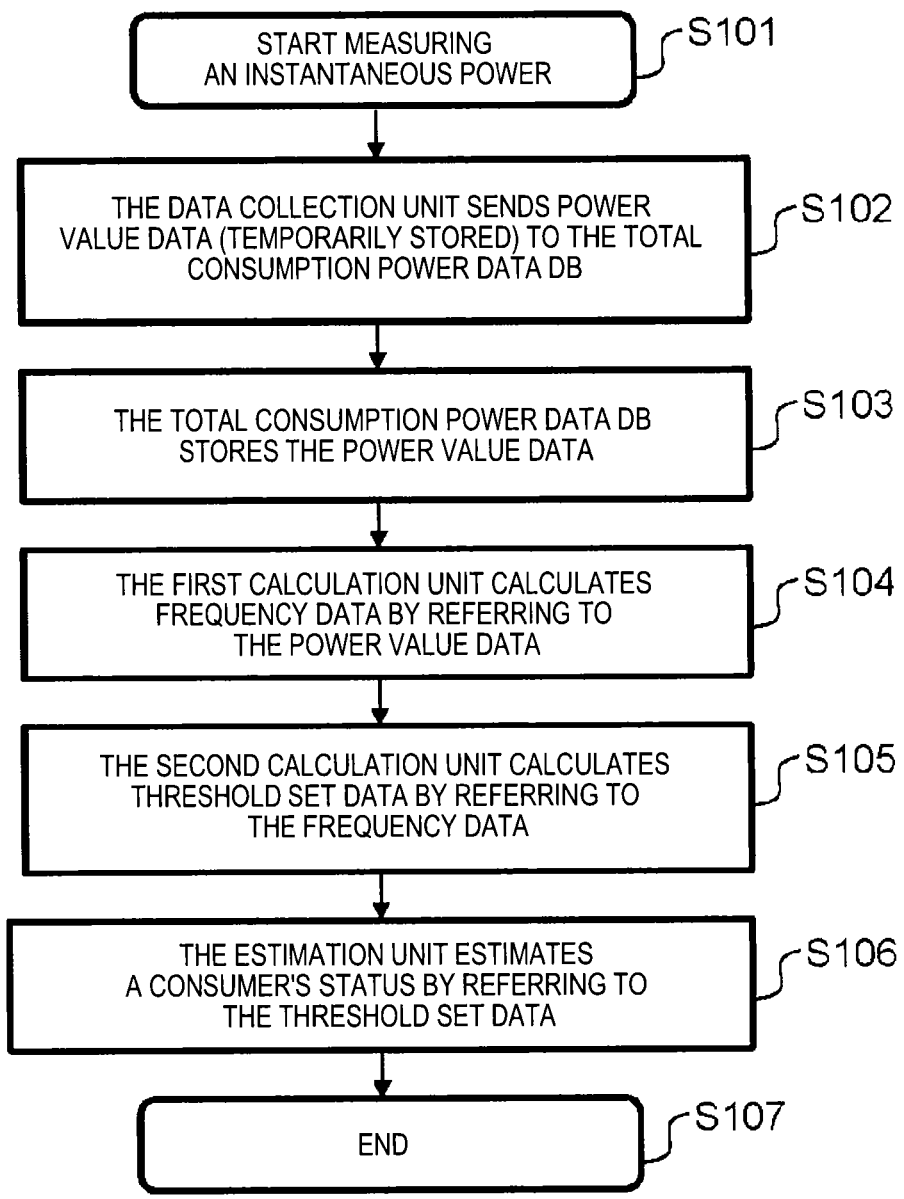
FIG. 12 is a flow chart of estimation method according to the first embodiment.

FIG. 12 is a flow chart of the estimation method.

The total consumption power measuring device 14 and the data collection unit 15 are operated by a manager's switching in the consumer, and measuring of an instantaneous power in the consumer is started (S101).

The total consumption power measuring device 14 measures the instantaneous power at one minute interval. The measurement value and measurement time are regarded as one power value data, and this power value data is sent to the data collection unit 15 wirelessly or wiredly. Furthermore, the data collection unit 15 temporarily stores the power value data received, and sends the power value data to the total consumption power measuring device 14 at a predetermined interval (For example, ten minutes interval) (S102).

The total consumption power data DB 110 stores the power value data received (S103). Here, in order not to doubly store the data, for example, it may be confirmed that a measurement time of data already stored is different from a measurement time of the latest data. Moreover, operation of storing at S103 may be independently performed in parallel with following steps.

In response to a trigger from the control unit 30, by referring to time series data of power value data of N days stored in the total consumption power data DB 110, the first calculation unit 40 calculates frequency data, and stores this frequency data into the frequency DB 120 (S104).

By referring to frequency data stored in the frequency DB 120, the second calculation unit 50 calculates threshold set data, and stores this threshold set data into the power threshold DB 130 (S105).

In response to a trigger from the control unit 30, by referring to the threshold set data, past measurement values or measurement values measured in real time stored in the total consumption power data DB 110, the estimation unit 60 estimates a behavior status, and stores this behavior status into the estimation result DB 150 (S106).

At timing when the estimation unit 60 completes estimating, or by a trigger from the control unit 30, above-mentioned steps are completed (S107).

Hereinafter, by referring to FIGS. 13-15, detail processing of S105 and S106 will be explained.

Figure 13:
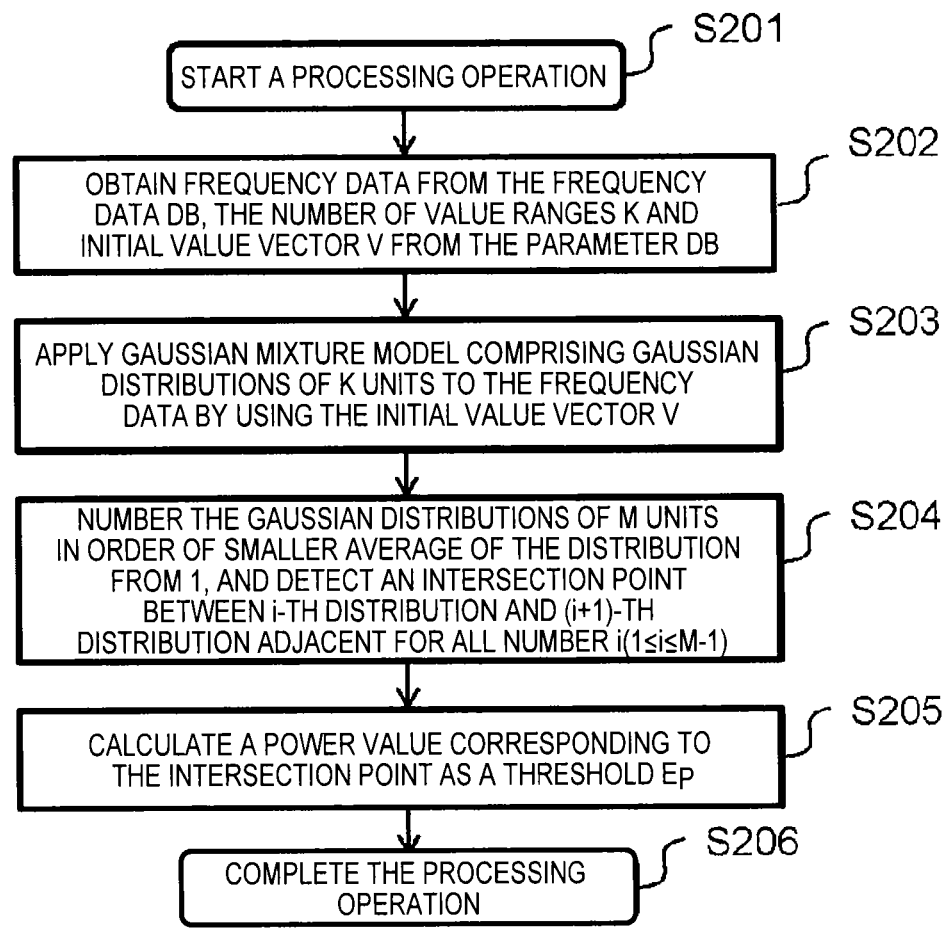
FIG. 13 is a flow chart of processing of the second calculation unit in FIG. 1.
Figure 14A:
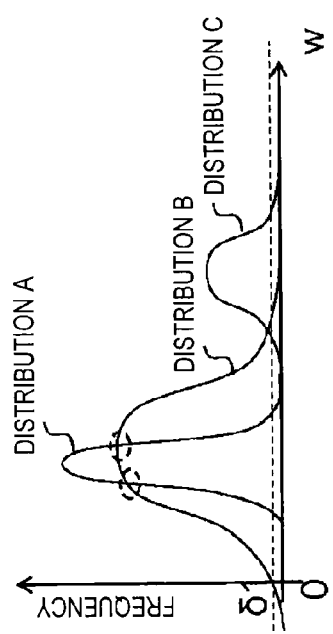
FIGS. 14A, 14B and 14C are schematic diagrams to explain processing of the second calculation unit in FIG. 1.
Figure 14B:
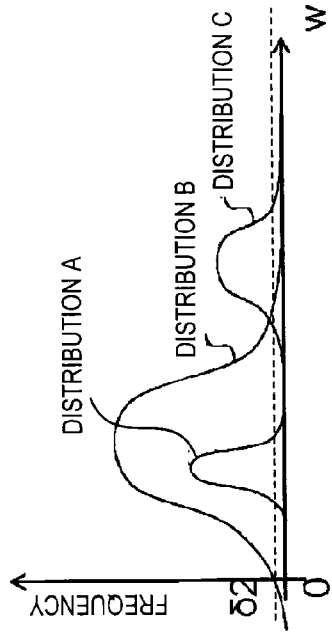
Figure 14C:
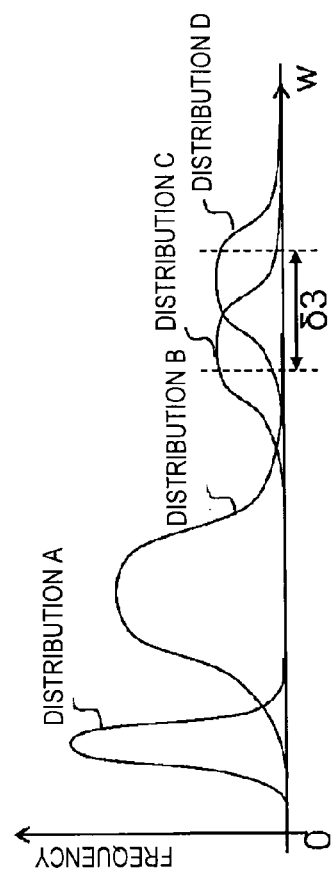

FIG. 13 is a flow chart of processing operation of the second calculation unit 50.

By obtaining a trigger from the control unit 30 or the first calculation unit 40, the approximation unit 51 starts processing operation (S201).

The approximation unit 51 obtains frequency data from the frequency data DB 120. Furthermore, the approximation unit 51 obtains an initial value of the number (K) of value ranges to be divided finally, and an initial value vector V from the parameter DB 140 (S202).

The approximation unit 51 applies Gaussian mixture model to the frequency data by using the initial value vector V (S203). Assume that the number of data points included in the frequency data is Q, and a set of data points is $\{x_1, x_2, \ldots, x_Q\}$. When this set of data points is given, a logarithmic likelihood of Gaussian mixture model composing Gaussian distributions of K units for this set is represented as following equation. Here, "ln" is natural logarithm. Furthermore, three parameters of Gaussian mixture model is V=$\{\pi, \mu, \sigma\}$. These represent three vectors respectively, parameters ($\lambda_1, \pi_2, \pi_3$) representing a mixture ratio of three parameters to be mixed, parameters ($\mu_1, \mu_2, \mu_3$) representing an average, and parameters ($\sigma_1, \sigma_2, \sigma_3$) representing a standard deviation.

$$\ln p(X|\pi, \mu, \sigma) = \sum_{n=i}^{Q} \ln \left\{ \sum_{k=i}^{K} \pi_k N(x_n | \mu_k, \sigma_k) \right\} \quad (1)$$

In the equation (1), N ($x_n|\mu_k, \sigma_k$) represents Gaussian distribution represented by following equation.

$$N(x_n | \mu_k, \sigma_k) = \frac{1}{\sqrt{2\pi\sigma_k^2}} e^{-\frac{(x_n-\mu_k)}{2\sigma_k^2}} \quad (2)$$

Parameter $\{\pi, \mu, \sigma\}$ of Gaussian distribution is calculated so as to maximize this logarithmic likelihood. Owing to this, conventional method such as EM (Expectation-Maximization) algorithm can be used. By assigning a serial number i (1≤i≤K) from 1 to Gaussian distributions of K units in order of smaller average of the distribution, the parameters of distribution are stored into the parameter DB 140. Here, i-the distribution $G_i$ is compared with (i+1)-th distribution $G_{(i+1)}$. At S204 explained afterwards, if two intersection points of which density (frequency) is larger than a predetermined probability density α1 are detected (FIG. 14A), or if all densities (larger than a predetermined probability density δ2) of one distribution is smaller than all densities of another distribution in a segment of all value ranges (FIG. 14B), one distribution of which variance is smaller is removed. In this case, as to all distributions remained, a serial number is assigned from 1 in order of smaller average thereof again. On the other hand, if a difference between averages of two distributions is smaller than a predetermined power value δ3 (FIG. 14C), these two distributions are merged as one distribution. The number (K) of distributions generated lastly is equal to the number (M) of value ranges.

In above explanation, a value of K is set from the parameter DB 140. However, K may be dynamically selected according to distribution of actual data. For example, while the value of K is incremented by repeating, Gaussian mixture model may be fitted to a plurality of values of K. As a condition to stop a loop to increase K, for example, following method may be used. By focusing on a value of likelihood of Gaussian mixture distribution fitted to the present K, in comparison with a likelihood thereof applied to a previous (K−1), if an increased value of likelihood of K is smaller than a predetermined value ε, the loop to increase K is stopped. Furthermore, this comparison processing may not be performed by "likelihood" only. For example, by using some constant α, when increase of (likelihood −αK) is stopped, the loop may be stopped. Here, by assigning a penalty when K is increased, K may be suppressed to be increased greatly.

As to i-th distribution $G_i$ and (i+1)-th distribution $G_{(i+1)}$ adjacent thereto, the threshold calculation unit 52 calculates an intersection point between averages of respective distributions (S204).

The threshold calculation unit 52 calculates a power value corresponding to the intersection point as a threshold $E_p$ (1≤p≤M) (S205). Moreover, above-mentioned method for calculating the threshold $E_p$ is one example. Furthermore, for example, as to an average $\mu_i$ of distribution $G_i$ and an average $\mu_{(i+1)}$ of distribution $G_{i+1}$ adjacent thereto, an average "($\mu_i + \mu_{(i+1)}$)/2" thereof may be the threshold $E_p$. Furthermore, by using not this simple average but $\pi_i$ and $\pi_{(i+1)}$ representing respective distributions, an internally dividing point to internally divide a distance between $\mu_i$ and $\mu_{(i+1)}$ by ($\pi_i:\pi_{(i+1)}$) may be the threshold $E_p$.

Moreover, in above explanation, Gaussian mixture model is used as the probability model. However, another mixture distribution may be used. For example, mixture log normal distribution may be used.

At timing when the threshold calculation unit 52 has calculated all thresholds $E_p$(1≤p≤M−1), above-mentioned steps are completed (S206).

Figure 15:
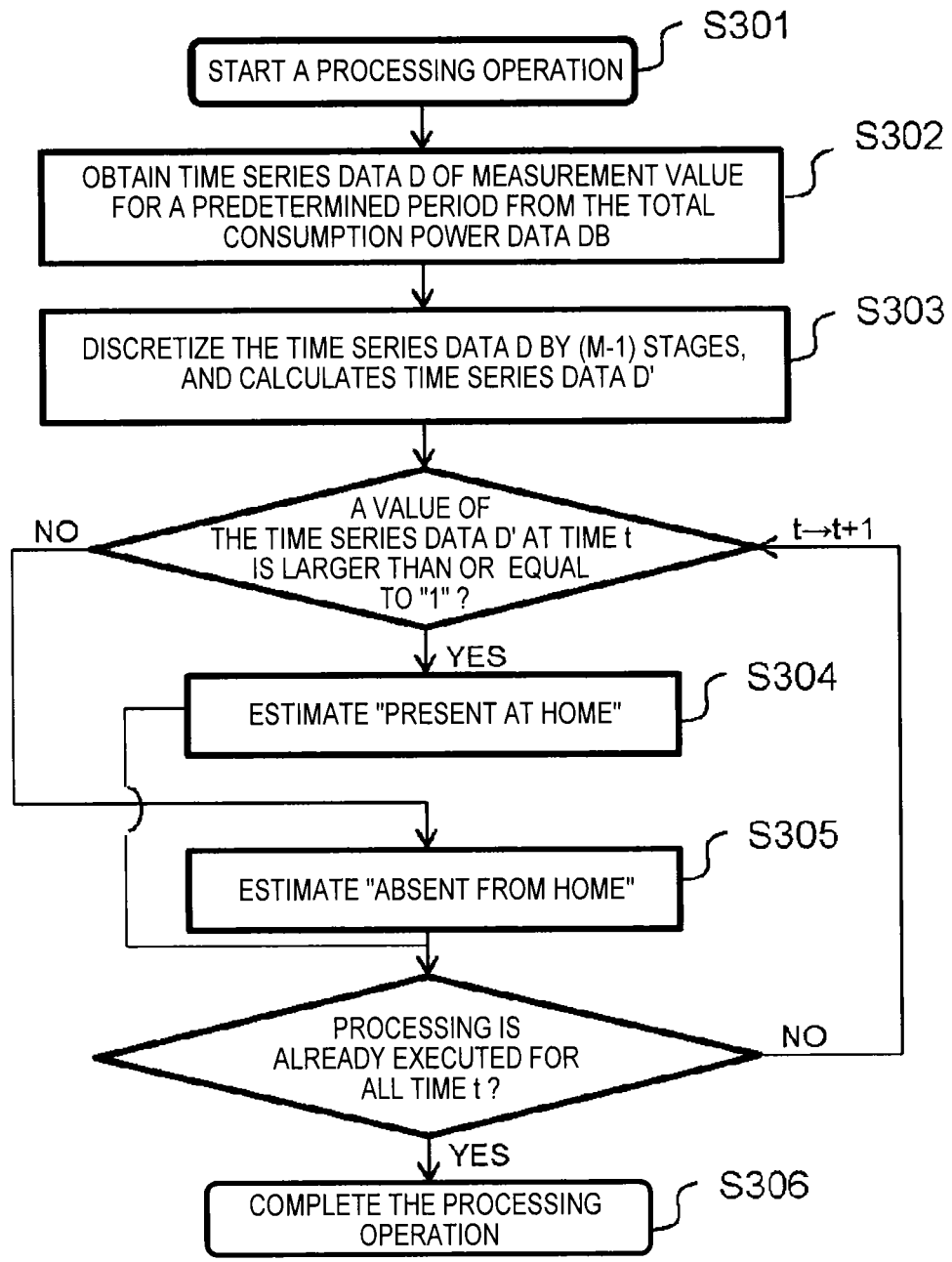
FIG. 15 is a flow chart of processing of the estimation unit in FIG. 1.

FIG. 15 is a flow chart of processing operation of the estimation unit 60.

By obtaining a trigger from the control unit 30, the discretization unit 61 starts processing operation (S301).

The discretization unit 61 obtains a set of thresholds of (M−1) units from the power threshold DB 130. Furthermore, the discretization unit 61 obtains time series data D of measurement values of a predetermined period (For example, the latest one day) from the total consumption power data DB 110 (S302). Here, information of a time slot corresponding to the measurement value to be used is previously stored in the parameter DB 140.

By using a set of thresholds of (M−1) units, the discretization unit 61 discretizes time series data D by (M−1) steps (0~(M−2)), and calculates time series data D' (S303).

By referring to the time series data D', as to each time slot (In FIG. 11B, 38 seconds) of the time series data D', if a value of the time series data D' is "0", the comparison unit 62 estimates "absent from home" at a time lot corresponding thereto (S304). If a value of the time series data D' is larger than or equal to "1", the comparison unit 62 estimates "present at home" at a time slot corresponding thereto (S305).

The comparison unit 62 stores time series data (estimation result) estimated at each time slot of the time series data D' into the parameter DB 140. At timing when above-mentioned steps are already executed to all time slots of the time series data D', the processing operation is completed (S306).

Moreover, for example, by using a hidden Markov model, the comparison unit 62 can estimate using statistical practical (experimental) knowledge of continuous time of "present at home" or time of "absent from home (go out)". For example, the hidden Markov model is structured using two states "present at home" and "absent from home". By using general statistical averages of a time of "present at home" and a time of "absent from home", a state transitional probability of each state is determined. Under this assumption, output of the hidden Markov model is considered as discretrized data from the time series data D', and an output probability is determined using knowledge such that, "while a person is absent from home, a probability to output a value larger than 1 is low. If the hidden Markov model is structured in this way, for example, by using Viterbi algorithm, a state transitional sequence having the highest probability to output the time series data D', i.e., time series data of "present at home • absent from home", can be generated. By using these time series data of "present at home • absent from home" for estimation, for example, influence due to noise that "present at home" and "absent from home" are repeated at unnatural short interval can be reduced. As a result, estimation accuracy can be further improved.

According to the first embodiment, based on statistical fact as explained in FIGS. 2 and 3, estimation accuracy of the consumer's behavior status can be improved. Furthermore, without a sensor and information "whether to be present at home" set by the consumer himself/herself, only based on a total consumption power as power consumption of all of consumer, the consumer's behavior status can be easily estimated.

In above explanation of the first embodiment, as an example, a measurement frequency by the total consumption power measuring device 14 is one minute. However, data can be obtained with another measurement frequency. For example, the measurement frequency may be short such as 10 seconds, 1 second, 1 millisecond, or long such as 10 minutes, 30 minutes, 1 hour. Furthermore, the measurement value may be an instantaneous value at the measurement timing, or an electric energy (accumulated electric energy) until the measurement timing. In case of the accumulated electric energy, an accumulated value or an average per a measurement interval, which is calculated using a difference between two measurement values measured at adjacent two measurement timing, can be used.

Furthermore, a format of power value data is not limited to that of FIG. 4. For example, time series data that the measurement time is recorded (time stamp) may not be stored. Power consumption data of N days measured randomly in the consumer may be stored in the power consumption power data DB 110 without information of time stamp. Furthermore, for example, N days may be continuous N days or randomly sampled N days in one month. Furthermore, for example, data of N days may be collected on weekdays of the same month, or holidays.

Furthermore, as the system of FIG. 1, various forms can be applied. For example, by excluding the estimation unit 60 and the estimation result DB 150 from the behavior estimation apparatus 1000 of the first embodiment, an apparatus having remained units and DBs is regarded as a threshold calculation apparatus. In this case, while the consumer equips the threshold calculation apparatus, an external server can equip the estimation unit 60 and the estimation result DB 150.

(The First Modification)

Figure 16:
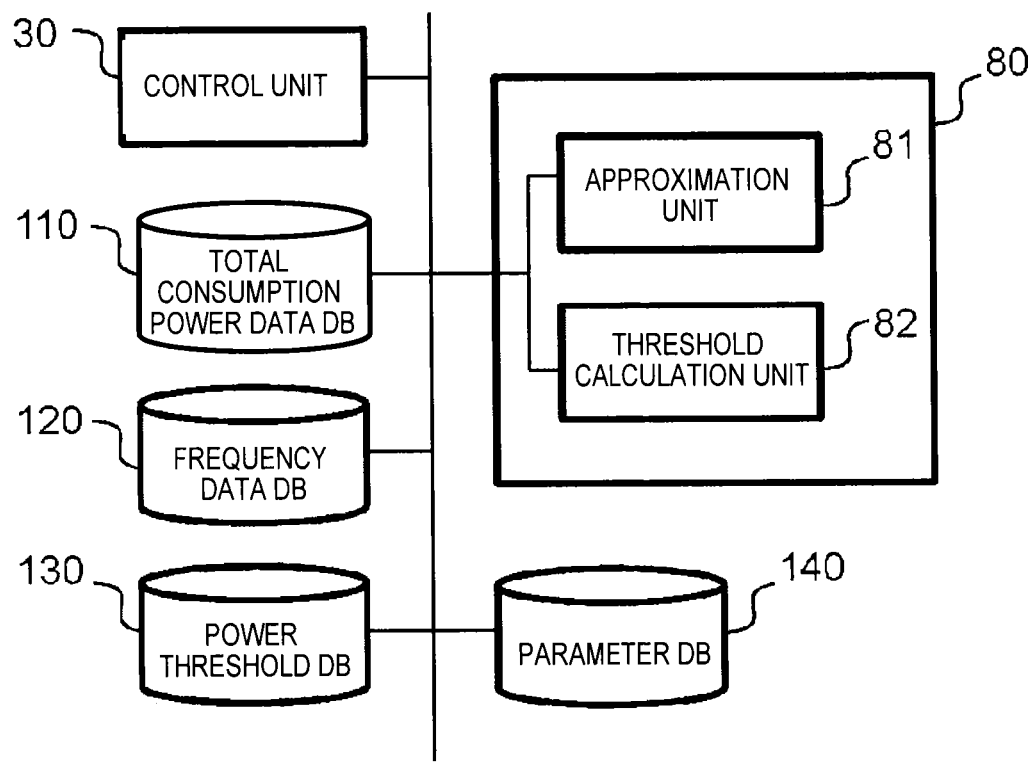
FIG. 16 is a block diagram of a second calculation unit according to a first modification of the first embodiment.

FIG. 16 is a block diagram of a second calculation unit 80 according to the first modification. The second calculation unit 80 includes an approximation unit (fifth calculation unit) 81 and a threshold calculation unit (sixth calculation unit) 82. Hereinafter, specific feature of the second calculation unit 80 different from the second calculation unit 50 in FIG. 6 will be explained.

Figure 17:
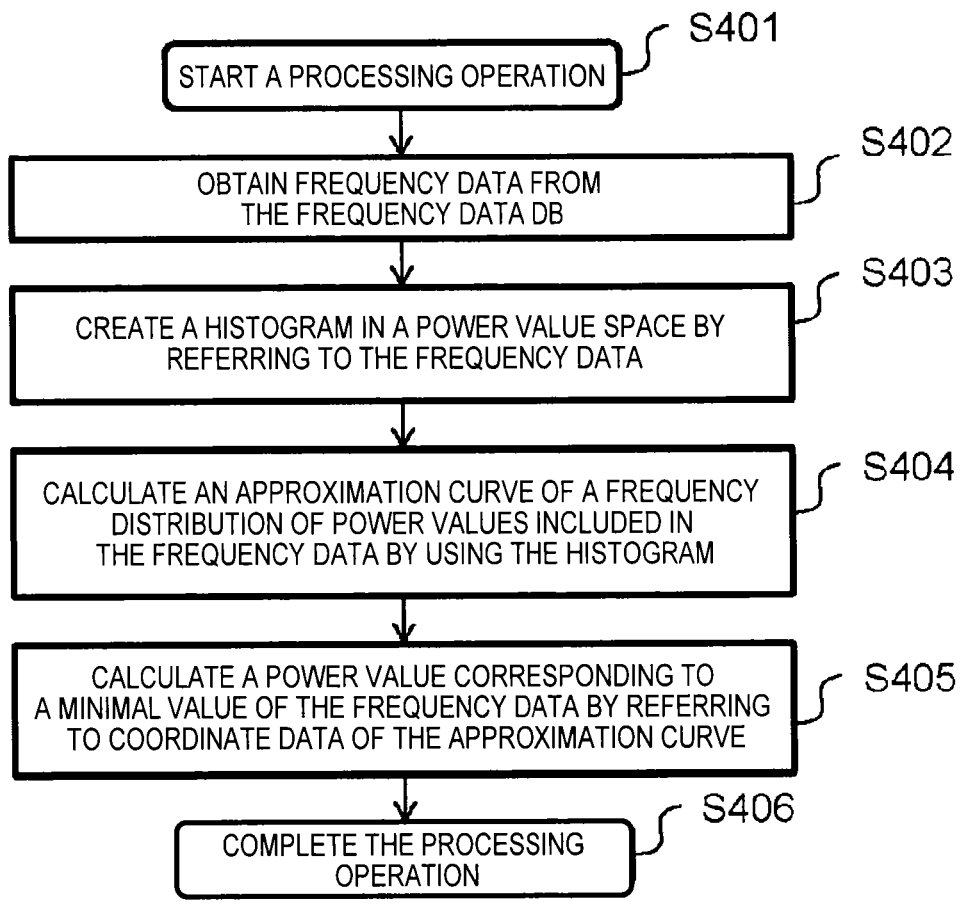
FIG. 17 is a flow chart of processing of the second calculation unit in FIG. 16.

FIG. 17 is a flow chart of processing operation of the second calculation unit 80 in FIG. 16.

By obtaining a trigger from the control unit 30, the approximation unit 81 starts processing operation (S401), and obtains frequency data from the frequency data DB 120 (S402).

By referring to the frequency data, the approximation unit 81 creates a histogram in a power value space of which horizontal axis is power value and vertical axis is frequency (S403).

The approximation unit 81 calculates an approximation curve of frequency distribution of power value included in the frequency data by using the histogram (S404). As a method for calculating the approximation curve, for example, by moving average calculated as a predetermined window width (For example, 100 W before and after) for a value range of the power value, an approximation curve by moving can be calculated. This approximation curve is regarded as coordinate data in the power value space, and stored into the frequency data DB 120.

Figure 18:
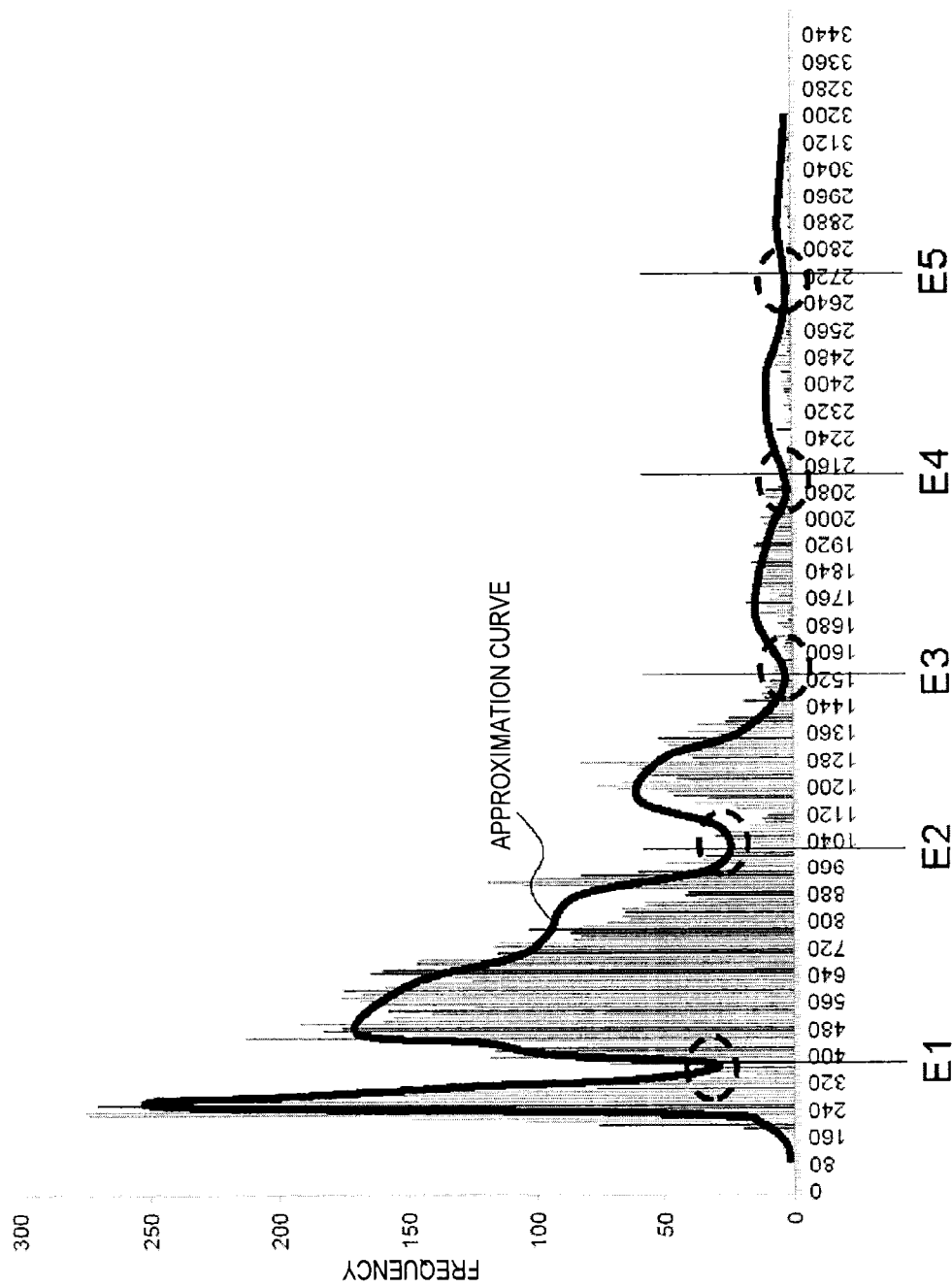
FIG. 18 is one example of approximated frequency distribution of measurement value according to the first modification.

By referring to the coordinate data of the approximation curve stored in the frequency data DB 120, as shown in FIG. 18, the threshold calculation unit 82 calculates a power value corresponding to a minimal value of the frequency as a threshold (S405). For example, as a predetermined window width (For example, 100 W before and after) for a value range of the power value, the minimal value can be calculated by executing differential operation to the approximation curve. The threshold calculated is stored into the power threshold DB 130. At timing when the threshold calculation unit 82 has calculated all thresholds, the processing operation is completed (S406). Here, the window width can be previously stored into the parameter DB 140.

(The Second Modification)

Figure 19:
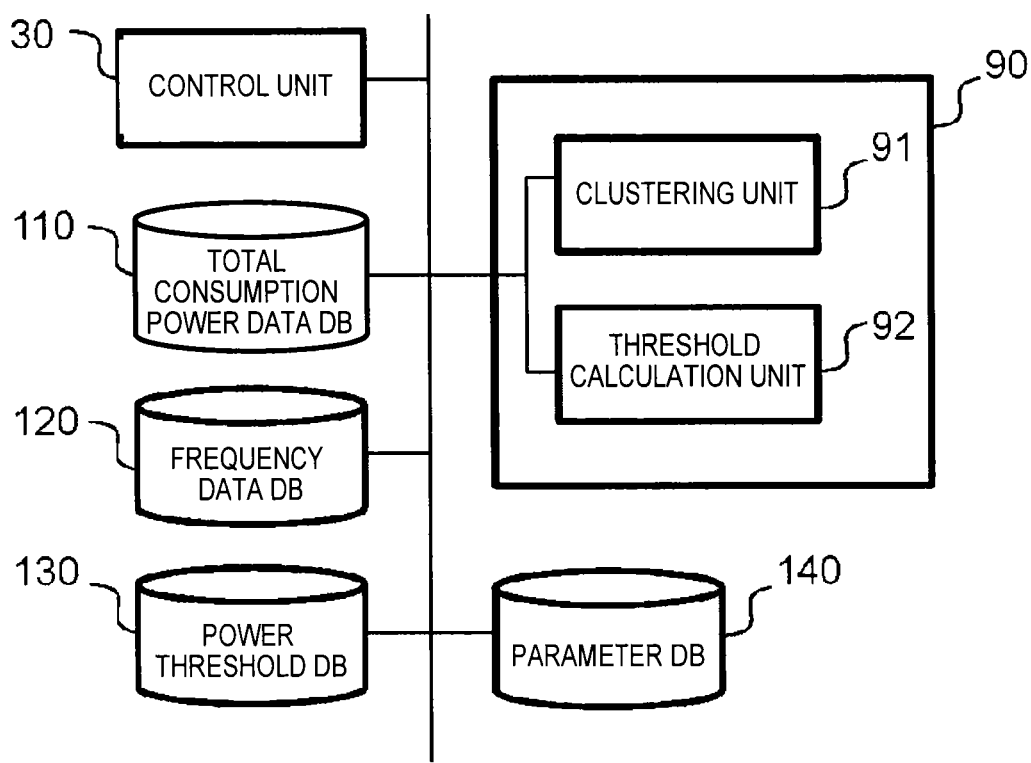
FIG. 19 is a block diagram of a second calculation unit according to a second modification of the first embodiment.

FIG. 19 is a block diagram of a second calculation unit 90 according to the second modification. The second calculation unit 90 includes a clustering unit (classifying unit) 91 and a threshold calculation unit (seventh calculation unit) 92. Hereinafter, specific feature of the second calculation unit 90 different from the second calculation unit 50 in FIG. 6 will be explained.

Figure 20:
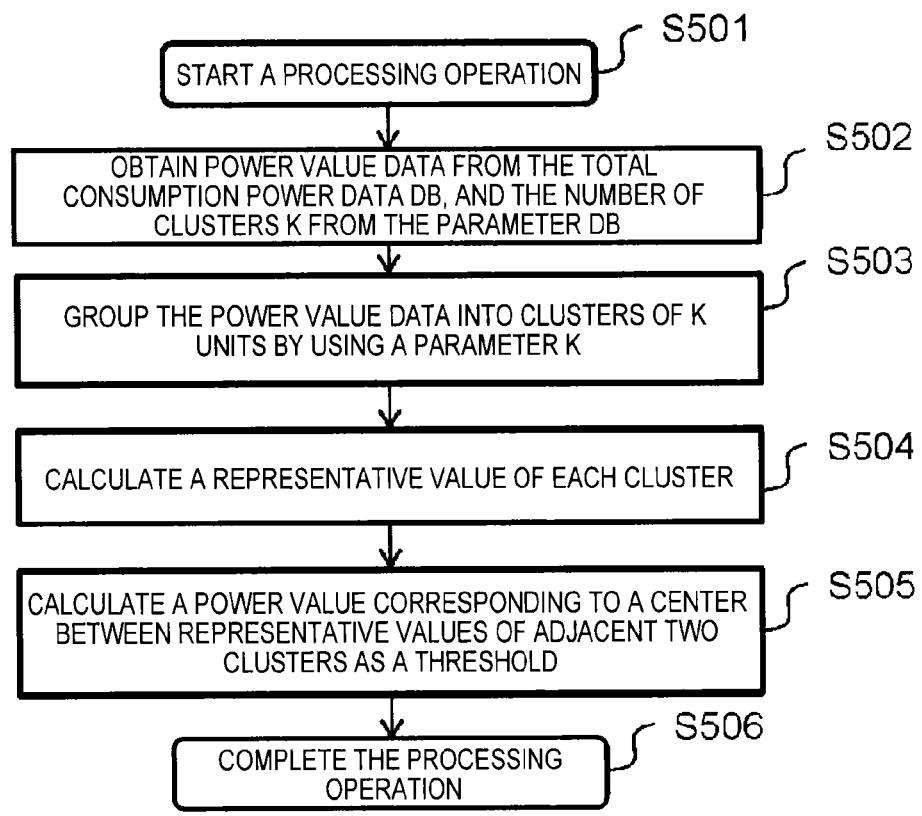
FIG. 20 is a flow chart of processing of the second calculation unit in FIG. 19.

FIG. 20 is a flow chart of processing operation of the second calculation unit 90 in FIG. 19.

By obtaining a trigger from the control unit 30, the clustering unit 91 starts processing operation (S501). The clustering unit 91 obtains power value data $\{x1, x2, \ldots, XQ\}$ of N days from the total consumption power data DB 110, and obtains the number (K) of clusters from the parameter DB 140 (S502).

Based on sparse and dense of the power value data of N days, the clustering unit 91 groups the power value data into clusters (groups) of K units (S503). As a method for clustering, K-means, K-monoids, K-medians, or DBSCAN (Density-based clustering), can be used. Furthermore, hierarchical clustering method can be used.

The threshold calculation unit 92 calculates a representative value of each cluster (S504). As the representative value of each cluster, for example, a power value of which data is the most densest in each cluster, i.e., a power value corresponding to a maximal value of the frequency, can be used.

Figure 21:
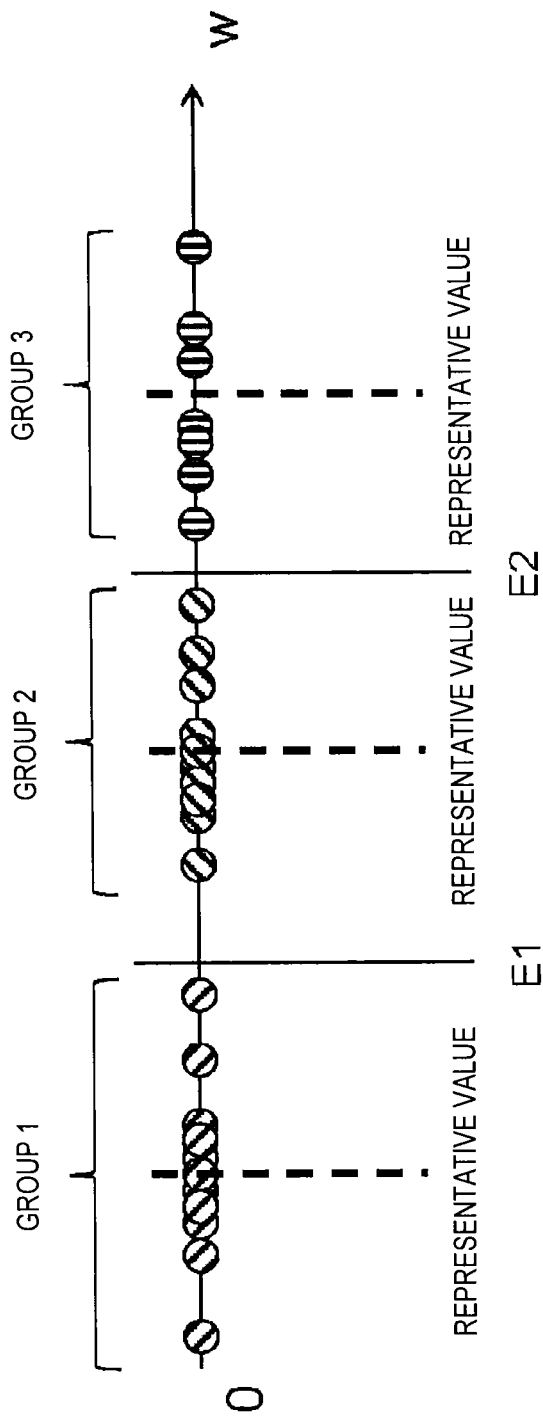
FIG. 21 is one example of clustering of measurement value according to the second modification.

As shown in FIG. 21, the threshold calculation unit 92 calculates a power value corresponding to a center of two representative values of adjacent two clusters as a threshold (S505). This threshold is stored into the power threshold DB 130. At timing when the threshold calculation unit 92 has calculated all thresholds, the processing operation is completed (S506).

Moreover, at S505, for example, by using the number of data D1 and D2 in adjacent two clusters, the threshold calculation unit 92 may calculate an internally dividing point to internally divide a distance between two representative values by (D1:D2) as a threshold.

(The Third Modification)

The third modification of the estimation unit 60 in FIG. 10 will be explained.

The estimation unit 60 of the third embodiment estimates a consumer's behavior status, i.e., a short term behavior or a long term behavior related to a person's power consumption in the consumer.

When a discretized measurement value is larger than (or equal to) 1 and smaller than (or equal to) 2, the comparison unit 62 in the estimation unit 60 estimates "long term behavior power", and that a person performs a long term behavior in the consumer. Furthermore, when the discretized measurement value is larger than (or equal to) 2 and smaller than (or equal to) 3, the comparison unit 62 estimates "short term behavior power", and that a person performs a short term behavior in the consumer. This estimation result is stored into the estimation result DB 150.

Moreover, by referring to time series data D', the comparison unit 62 can estimate the consumer's behavior status based on time (period) while the discretized measurement value is included in each value range. For example, when a status that the discretized measurement value is larger than (or equal to) 1 and smaller than (or equal to) 2 is continued for a predetermined time (continuous time), the comparison unit 62 estimates "long term behavior power". When a status that the discretized measurement value is larger than (or equal to) 2 and smaller than (or equal to) 3 is continued for a predetermined time, the comparison unit 62 estimates "short term behavior power".

The Second Embodiment

Figure 22:
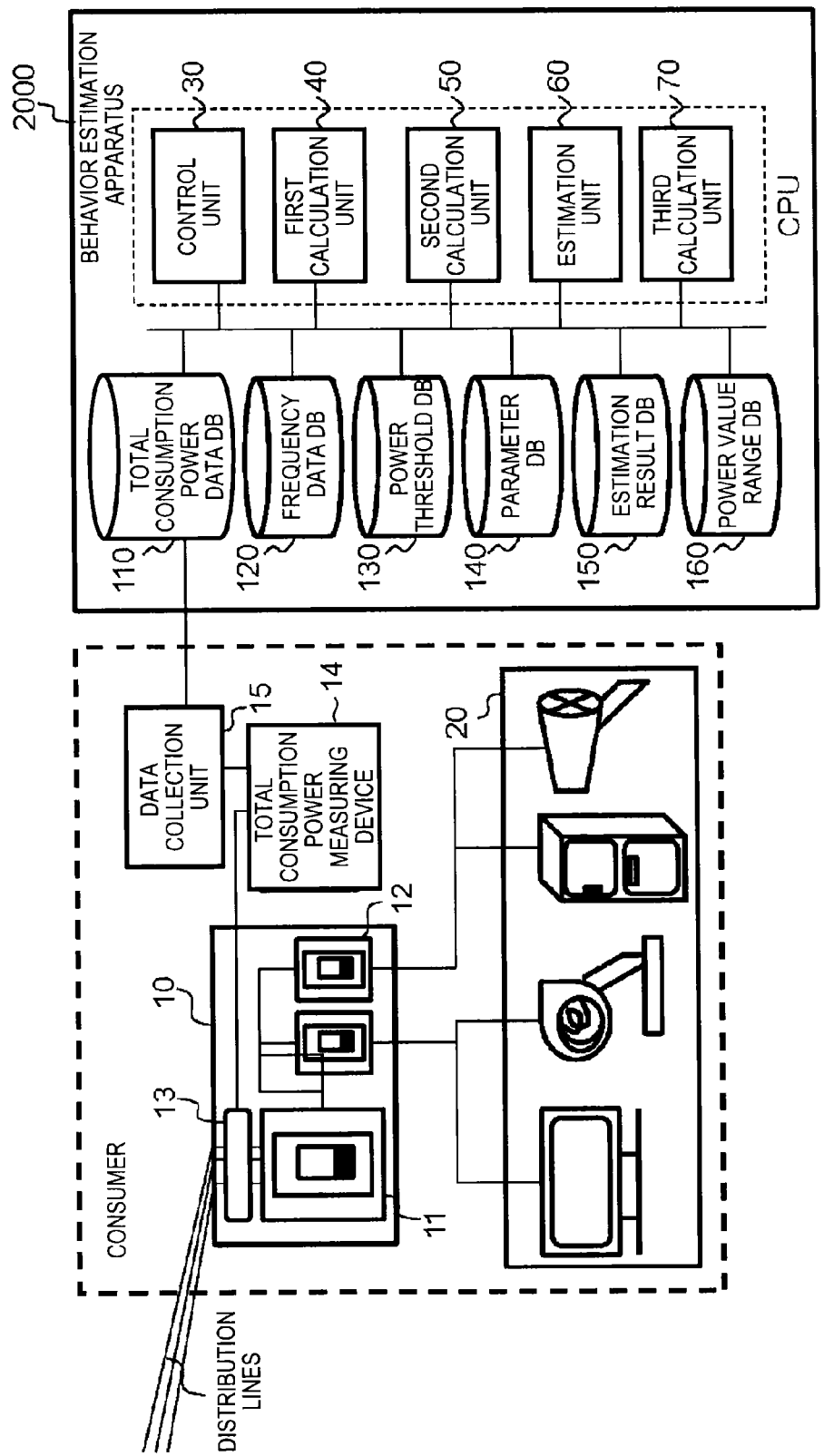
FIG. 22 is a block diagram of a system including an estimation apparatus according to a second embodiment.

FIG. 22 is a block diagram of a system including a behavior estimation apparatus 2000 of the second embodiment. In comparison with the behavior estimation apparatus 1000, the behavior estimation apparatus 2000 further includes a third calculation unit 70 and a power value range DB 160. In the behavior estimation apparatus 2000, as to the same unit (or the same DB) as the behavior estimation apparatus 1000, the same sign is assigned, and detail explanation thereof is omitted.

By referring to threshold set data stored in the power threshold DB 130, the third calculation unit 70 classifies a plurality of value ranges (divided by the threshold set data) into each behavior status, and calculates a plurality of classified value ranges (value range set). Specifically, the third calculation unit 70 calculates one "base power value range" and, one or a plurality of "behavior power value range".

Figure 23:
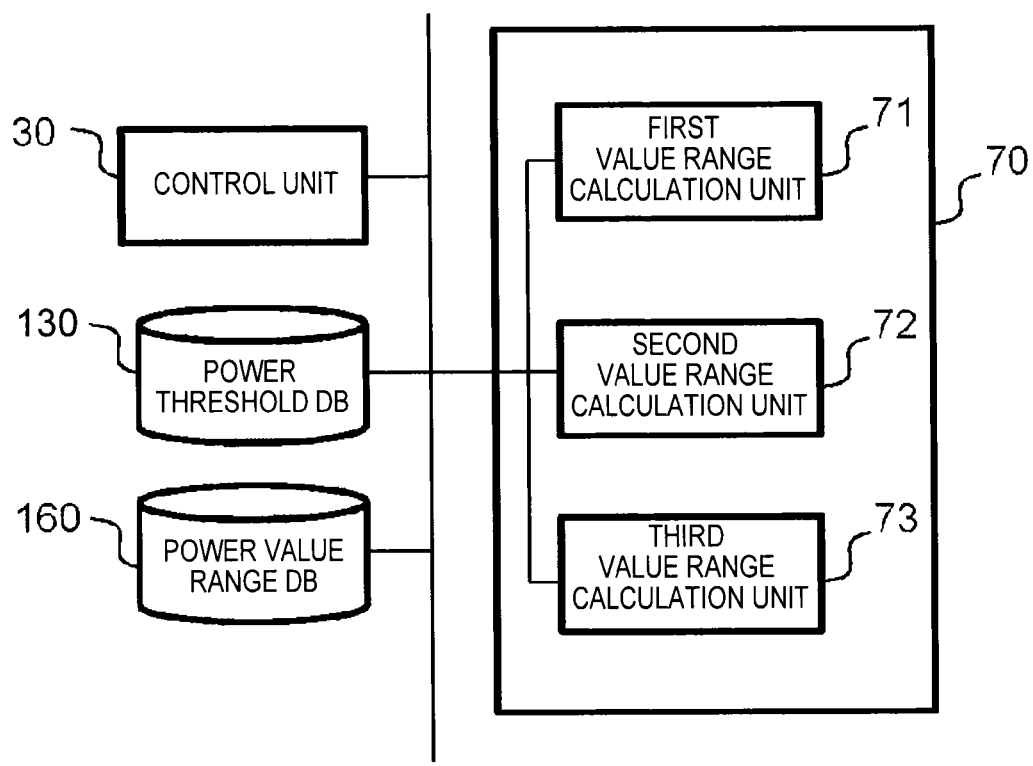
FIG. 23 is a block diagram of a third calculation unit in FIG. 22.

FIG. 23 is a block diagram of the third calculation unit 70. The third calculation unit 70 includes a first value range calculation unit 71, a second value range calculation unit 72, and a third value range calculation unit 73.

By referring to threshold set data stored in the power threshold DB 130, the first value range calculation unit 71 classifies one range value of which values are smaller than the lowest threshold (E1) into "base power value range". Furthermore, the first value range calculation unit 71 classifies one or a plurality of range values of which values are larger than (or equal to) the threshold (E1) into "behavior power value range". This classification result is stored into the power value range DB 160.

In case of "M (the number of value ranges)≥3", the second value range calculation unit 72 further classifies "behavior power value range" into two power value ranges. Namely, the second value range calculation unit 72 classifies one value range of which values are smaller than the second lowest threshold (E2) into "long term behavior power value range". Furthermore, the second value range calculation unit 72 classifies one or a plurality of value ranges of which values are larger than (or equal to) the threshold (E2) into "short term behavior power value range". This classification result is stored into the power value range DB 160.

In case of "M (the number of value ranges)≥4", the third value range calculation unit 73 further classifies "short term behavior power value range" into two power value ranges. Here, the case of "M=4" will be explained as an example. The third value range calculation unit 73 further classifies "short term behavior power value range" into at least one value range of which values are smaller than the third lowest threshold (E3), and at least one value range of which values are larger than (or equal to) the threshold (E3). This classification result is stored into the power value range DB 160.

FIG. 24 is one example of the power value range set data.

Figure 25:
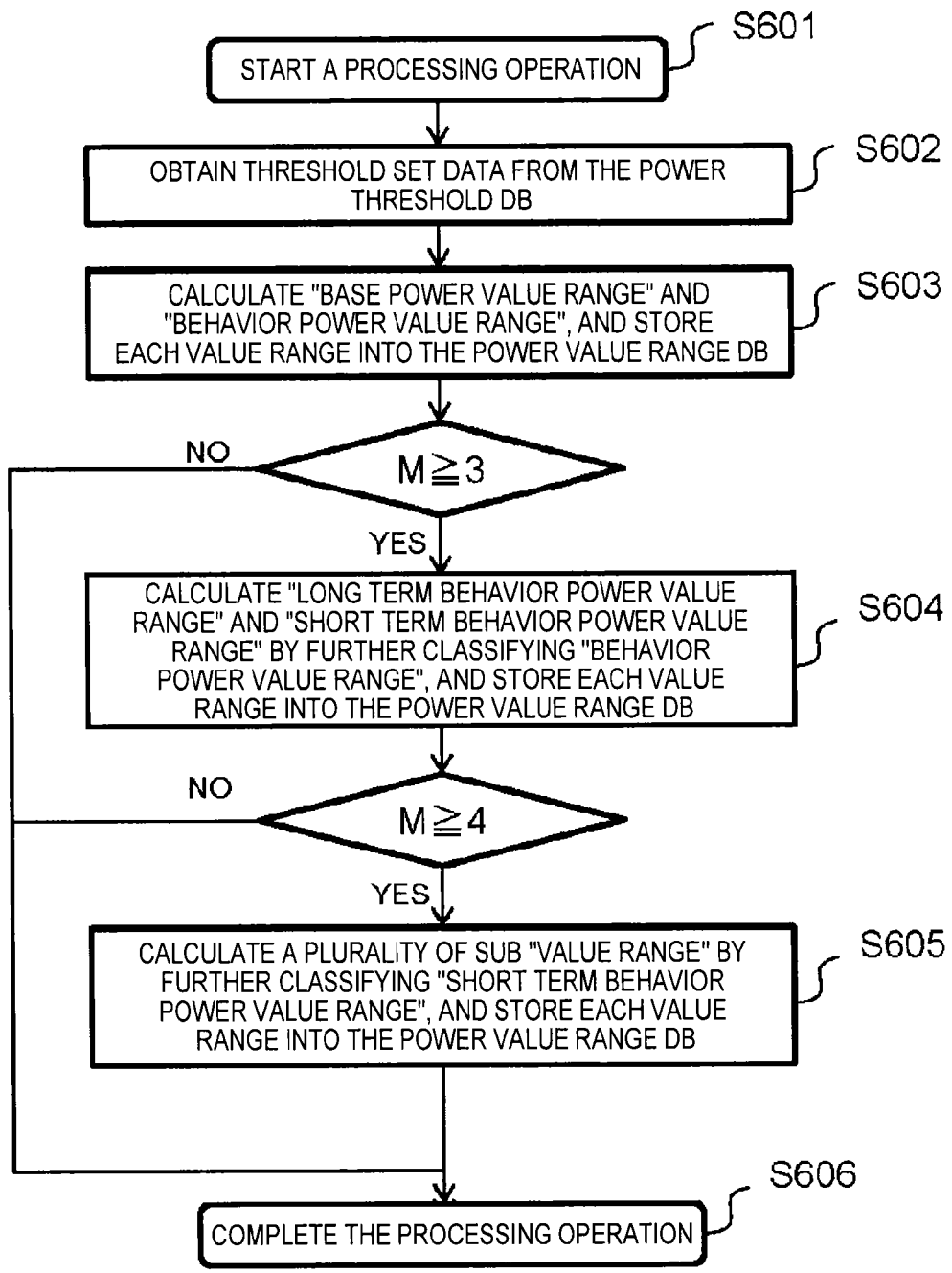
FIG. 25 is a flow chart of processing of the third calculation unit.

FIG. 25 is a flow chart of processing operation of the third calculation unit 70.

By obtaining a trigger from the control unit 30 or the second calculation unit 50, the first value range calculation unit 71 starts processing operation (S601).

The first value range calculation unit 71 obtains threshold set data from the power threshold DB 130 (S602).

The first value range calculation unit 71 stores one value range of which values are smaller than the lowest threshold (E1) as "base power value range" (0≤X≤E1) into the power value range DB 160. Furthermore, the first value range calculation unit 71 stores one or a plurality of value ranges of which values are larger than the threshold (E1) as "behavior power value range" (E1≤X) into the power value range DB 160 (S603).

In case of "M≥3", processing is forwarded to S604. In another case, the processing operation is completed (S606).

As to value ranges of which values are larger than (or equal to) the lowest threshold (E1), the second value range calculation unit 72 stores one value range of which values are smaller than the second lowest threshold (E2) as "long term behavior power value range" (E1≤X≤E2) into the power value range DB 160. Furthermore, the second value range calculation unit 72 stores one or a plurality of value ranges of which values are larger than the threshold (E2) as "short term behavior power value range" (E2≤X) into the power value range DB 160 (S603).

In case of "M≥4", processing is forwarded to S605. In another case, the processing operation is completed (S606).

The third value range calculation unit 73 further classifies "short term behavior power value range" into a plurality of sub value ranges, and stores each sub value range into the power value range DB 160 (S605). Specifically, by using the third lowest threshold (E3) and other thresholds following therefrom, the third value range calculation unit 73 classifies "short term behavior power value range" into sub value ranges of (M-2) units. At timing when above-mentioned steps are already executed, the processing operation is completed (S606).

In above explanation, "behavior power value range" is classified into one "long term behavior power value range" and a plurality of "short term behavior power value range". However, "long term behavior power value range" may be classified into a plurality of units, in the same way as "short term behavior power value range".

Furthermore, as the system of FIG. 22, various forms can be applied. For example, by excluding the estimation unit 60, the estimation result DB 150 and the power value range DB 160 from the behavior estimation apparatus 2000 of the second embodiment, an apparatus having remained units and DBs is regarded as a threshold calculation apparatus. In this case, while the consumer equips the threshold calculation apparatus, an external server can equip the estimation unit 60, the estimation result DB 150 and the power value range DB 160.

According to at least one embodiment as explained above, estimation accuracy of the consumer's behavior status can be improved.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operating system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for estimating behavior status, comprising:
a storage unit to store first data collecting power values consumed by a consumer in a period;
a first calculation unit configured to calculate second data representing a frequency of each power value by using the first data;
a second calculation unit configured to calculate a first threshold to divide a first power value from a second power value which is larger than and next to the first power value, among power values corresponding to maximal values of frequencies included in the second data; and
an estimation unit configured to obtain a power value consumed by the consumer in an estimating period, and to estimate the consumer's behavior status in the estimating period by using the power value and the first threshold.

2. The apparatus according to claim 1, wherein
the second calculation unit calculates a second threshold to divide a third power value which is the smallest from a fourth power value which is smaller than and next to the third power value, and
the estimation unit estimates whether a person is in the consumer or absent from the consumer by comparing the power value consumed by the consumer in the estimating period with the second threshold.

3. The apparatus according to claim 1, wherein
the estimation unit estimates whether a behavior related to the person's power consumption in the consumer is a short term behavior or a long term behavior by comparing the power value consumed by the consumer in the estimating period with the first threshold.

4. The apparatus according to claim 1, wherein
the second calculation unit comprises
a third calculation unit configured to calculate a plurality of probability distributions each including a maximal value by fitting a probability model to the second data; and
a fourth calculation unit configured to calculate a power value corresponding to an intersection point of adjacent probability distributions as the first threshold.

5. The apparatus according to claim 4, wherein
the probability model is Gaussian mixture model.

6. The apparatus according to claim 1, wherein
the second calculation unit comprises
a fifth calculation unit configured to calculate an approximation curve of the frequency by using the second data; and
a sixth calculation unit configured to calculate a power value corresponding to a minimal value of the approximation curve as the first threshold.

7. The apparatus according to claim 6, wherein
the approximation curve is an approximation curve by moving average.

8. The apparatus according to claim 1, wherein
the second calculation unit comprises
a classifying unit configured to classify the first data into a plurality of clusters, based on the frequency; and
a seventh calculation unit configured to calculate a power value corresponding to a maximal value of the frequency in each of the plurality of clusters as a representative value of the cluster, and to calculate a power value to divide two representative values of adjacent clusters as the first threshold.

9. The apparatus according to claim 1, wherein
the power value includes an instantaneous power used at a timing or an accumulated electric energy used in an interval.

10. The apparatus according to claim 1, wherein
the frequency includes an occurrence frequency or a probability density of the power value.

11. The apparatus according to claim 1, wherein
the estimating period is an arbitrary period including the present time or an arbitrary period in the past.

12. An apparatus for calculating a threshold, comprising:
a storage unit to store first data collecting power values consumed by a consumer in a predetermined period;

a first calculation unit configured to calculate second data representing a frequency of each power value by using the first data; and a second calculation unit configured to calculate a first threshold to divide a first power value from a second power value which is larger than and next to the first power value, among power values corresponding to maximal values of frequencies included in the second data.

13. A method for estimating behavior status, comprising:

by using first data collecting power values consumed by a consumer in a predetermined period, calculating second data representing a frequency of each power value;

calculating a first threshold to divide a first power value from a second power value which is larger than and next to the first power value, among power values corresponding to maximal values of frequencies included in the second data;

obtaining a power value consumed by the consumer in an estimating period; and estimating the consumer's behavior status in the estimating period by using the power value and the first threshold.

14. The method according to claim 13, wherein the calculating a first threshold comprises calculating a second threshold to divide a third power value which is the smallest from a fourth power value which is smaller than and next to the third power value; and the estimating comprises estimating whether a person is in the consumer or absent from the consumer by comparing the power value consumed by the consumer in the estimating period with the second threshold.

15. The method according to claim 13, wherein the estimating comprises estimating whether a behavior related to the person's power consumption in the consumer is a short term behavior or a long term behavior by comparing the power value consumed by the consumer in the estimating period with the first threshold.

16. A non-transitory computer readable medium for causing a computer to perform operations for estimating behavior status, the operations comprising:

by using first data collecting power values consumed by a consumer in a predetermined period, calculating second data representing a frequency of each power value;

calculating a first threshold to divide a first power value from a second power value which is larger than and next to the first power value, among power values corresponding to maximal values of frequencies included in the second data;

obtaining a power value consumed by the consumer in an estimating period; and estimating the consumer's behavior status in the estimating period by using the power value and the first threshold.

17. The non-transitory computer readable medium according to claim 16, wherein the calculating a first threshold comprises calculating a second threshold to divide a third power value which is the smallest from a fourth power value which is smaller than and next to the third power value; and the estimating comprises estimating whether a person is in the consumer or absent from the consumer by comparing the power value consumed by the consumer in the estimating period with the second threshold.

18. The non-transitory computer readable medium according to claim 16, wherein the estimating comprises estimating whether a behavior related to the person's power consumption in the consumer is a short term behavior or a long term behavior by comparing the power value consumed by the consumer in the estimating period with the first threshold.

* * * * *